(12) United States Patent
Sagayama

(10) Patent No.: US 8,511,008 B2
(45) Date of Patent: Aug. 20, 2013

(54) SOLAR CELL MODULE ATTACHMENT STRUCTURE AND SOLAR CELL APPARATUS

(75) Inventor: Kenichi Sagayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 205 days.

(21) Appl. No.: 13/060,490

(22) PCT Filed: Aug. 18, 2009

(86) PCT No.: PCT/JP2009/064450
§ 371 (c)(1), (2), (4) Date: Feb. 24, 2011

(87) PCT Pub. No.: WO2010/024154
PCT Pub. Date: Mar. 4, 2010

(65) Prior Publication Data
US 2011/0146763 A1 Jun. 23, 2011

(30) Foreign Application Priority Data
Aug. 29, 2008 (JP) ................. 2008-222615

(51) Int. Cl.
*E04D 13/18* (2006.01)
*E04H 14/00* (2006.01)
*H02N 6/00* (2006.01)
*H01L 31/042* (2006.01)

(52) U.S. Cl.
USPC .......................... 52/173.3; 136/244

(58) Field of Classification Search
USPC ............... 52/173.3; 411/172–174; 136/243, 136/244, 251
See application file for complete search history.

(56) References Cited

U.S. PATENT DOCUMENTS

| | | | | |
|---|---|---|---|---|
| 5,820,322 A | * | 10/1998 | Hermann et al. | 411/85 |
| 5,827,026 A | * | 10/1998 | Patti | 411/174 |
| 6,093,884 A | * | 7/2000 | Toyomura et al. | 136/244 |
| 6,414,237 B1 | * | 7/2002 | Boer | 136/251 |
| 6,688,825 B1 | * | 2/2004 | Stewart et al. | 411/174 |
| 7,614,183 B2 | * | 11/2009 | Nomura et al. | 47/65.9 |
| 7,694,466 B2 | * | 4/2010 | Miyamoto et al. | 52/173.3 |
| 7,814,899 B1 | * | 10/2010 | Port | 126/623 |
| 7,959,392 B2 | * | 6/2011 | Cooley | 411/332 |
| 2011/0146763 A1 | * | 6/2011 | Sagayama | 136/251 |

FOREIGN PATENT DOCUMENTS

| | | | |
|---|---|---|---|
| JP | 07-153983 | * | 11/1993 |
| JP | 7-153983 | | 6/1995 |
| JP | 8-312088 | | 11/1996 |
| JP | 9-148612 | | 6/1997 |
| JP | 2001-65120 | | 3/2001 |
| JP | 2001065120 A | * | 3/2001 |

(Continued)

*Primary Examiner* — Andrew Triggs
(74) *Attorney, Agent, or Firm* — Nixon & Vanderhye, P.C.

(57) ABSTRACT

A solar cell module attachment structure according to one embodiment of the present invention is a solar cell module attachment structure for attaching, face-to-face, edges of two solar cell modules (2) that are disposed adjacent and spaced from each other on a top face (12) of an attachment base (11) disposed along the edges in a front-rear direction, wherein with the use of an upper fixing fitting 3a including a pressing plate 31 and protrusion pieces 32, a lower fixing fitting 4 including an upper plate 40 and a lower plate 50, and a bolt 8, the bolt 8 inserted from above into a pressing plate hole 33 formed in the pressing plate 31 is inserted and fixed in a lower plate connecting hole 51 formed in the lower plate 50 of the lower fixing fitting 4.

14 Claims, 28 Drawing Sheets

(56) References Cited

FOREIGN PATENT DOCUMENTS

| JP | 2001-164713 | 6/2001 |
| JP | 2003-124493 | 4/2003 |
| JP | 2004-60358 | 2/2004 |

* cited by examiner (a)

(b)

(a)

(b)

(a)

(b)

(a)

(b)

SOLAR CELL MODULE ATTACHMENT STRUCTURE AND SOLAR CELL APPARATUS

This application is the U.S. national phase of International Application No. PCT/JP2009/1064450, filed 18 Aug. 2009, which designated the U,S. and claims priority to JP Application No. 2008-222615, filed 29 Aug. 2008, the entire contents of each of which are hereby incorporated by reference.

TECHNICAL FIELD

The present invention relates to a solar cell module attachment structure for attaching a solar cell module onto a stand, and a solar cell apparatus.

BACKGROUND ART

Solar cell modules are generally made up of a rectangular solar cell panel and a frame member that holds the solar cell panel. As the frame member holding the solar cell panel, a frame member having a structure including a wall portion formed vertically along one side of the solar cell panel and a holding portion that is formed on the upper portion of the wall portion and that has a quadrangular cross section having one side open is generally used (see, for example, FIGS. 2 and 5 of Patent Document 1).

The holding portion of the frame member is constituted by a vertically formed holding wall, and an upper holding piece and a lower holding piece that extend inward from the upper end and the lower end of the holding wall, respectively, and that hold the solar cell panel with the side edge fitted therebetween.

With a solar cell module using the frame member configured to include a holding portion with a quadrangular cross section having one side open, the edge of the solar cell panel is inserted into the holding portion with a quadrangular cross section having one side open, and thereby the solar cell panel is vertically sandwiched.

Generally, stands are used for installation of solar cell modules configured as described above, and a solar cell module is placed and fixed onto a stand by bringing the bottoms of the wall portions of the solar cell module into contact with the upper face of the stand (see, for example, FIG. 7 of Patent Document 1). In the case where a plurality of solar cell modules are used, the solar cell modules are laid out on the stand.

PRIOR ART DOCUMENTS

Patent Documents
  Patent Document 1: JP H9-148612 A

SUMMARY OF INVENTION

Problems to be Solved by the Invention

The above-described solar cell module using the frame member configured to include a holding portion with a quadrangular cross section having one side open is installed on the roof or the like, in the state of being installed on the stand. Accordingly, the solar cell module may be exposed to strong wind.

When the solar cell module is exposed to strong wind, the wind blowing into the backside of the solar cell panel constituting the solar cell module may act as a force trying to lift the solar cell panel up from below. In such a case, in the frame member of the solar cell module, the distal end of the upper holding piece of the holding portion with a quadrangular cross section having one side open to which the edge of the solar cell panel has been inserted may be lifted up from below, raised and deformed, causing a possibility that the edge of the solar cell panel might be detached upward.

The present invention has been conceived to cope with the above situations and provides a solar cell module attachment structure with which a solar cell module can be easily attached to a stand, and in a state in which the solar cell module is attached to the stand, even if the wind blowing into the backside of the solar cell panel tries to lift the solar cell panel up from below, the edge portion of the solar cell panel is prevented from being detached from the holding portion of the frame member holding the solar cell panel, and a solar cell apparatus.

Means for Solving the Problems

Hereinafter, a solar cell module attachment structure according to the present invention will be described. In the following description, reference numerals, which are used in the drawings used to illustrate Modes for Carrying out the Invention in this specification, are shown in parentheses for reference.

A first solar cell module attachment structure according to the present invention is a solar cell module attachment structure for attaching, face-to-face, edges of two adjacently disposed solar cell modules (2) onto a top face (12) of an attachment base (11) disposed along the edges.

In the first solar cell module attachment structure of the present invention, each edge of the solar cell modules (2) is provided with a frame member (21) including: a holding portion (29) holding the solar cell panel (20); a wall portion (23) provided continuously with the holding portion (22); and a bottom portion (24) that is provided continuously with the wall portion (23) on a side opposite to the holding portion (22) and that is attached onto the top face (12).

In the first solar cell module attachment structure of the present invention, at least a lower fixing fitting (4) is used.

In the first solar cell module attachment structure of the present invention, with the use of the lower fixing fitting (4), the bottom portion (24) of the frame member (21) is fixed on the top face (12) of the attachment base (11), and the edges of the two solar cell modules (2) are positioned relative to each other.

A second solar cell module attachment structure according to the present invention is a solar cell module attachment structure for attaching, face-to-face, edges of two solar cell modules (2) that are disposed adjacent and spaced from each other on a top face (12) of an attachment base (11) disposed along the edges.

In the second solar cell module attachment structure of the present invention, each edge of the solar cell modules (2) is provided with a frame member (21) including: a holding portion (22) holding the solar cell panel (20); a wall portion (23) provided continuously with the holding portion (22); and a bottom portion (24) that is provided continuously with the wall portion (23) on a side opposite to the holding portion (22) and that is attached onto the top face (12).

In the second solar cell module attachment structure of the present invention, an upper fixing fitting (3a) and a lower fixing fitting (4) are used.

The upper fixing fitting (3a) is disposed so as to extend across a gap (7) formed between the frame members (21) of the two adjacent solar cell modules (2) in a direction in which the solar cell modules (2) are adjacent and presses from above the holding portions (22) of the frame members (21) of the two adjacent solar cell modules (2).

The lower fixing fitting (4) vertically sandwiches the top face (12) of the attachment base (11).

In the second solar cell module attachment structure of the present invention, the solar cell modules (2) are attached to the attachment base (11) in the manner described below using the upper fixing fitting (3a) and the lower fixing fitting (4).

Specifically, the two adjacent solar cell modules (2) are attached to the attachment base (11) by inserting a connecting member (8), such as a bolt, inserted into the upper fixing fitting (3a) from above into the lower fixing fitting (4) via the gap (7) formed between the frame members (21) of the two adjacent solar cell modules (2), the lower fixing fitting (4) and the top face (12) of the attachment base (11).

A third solar cell module attachment structure according to the present invention is a solar cell module attachment structure for attaching, face-to-face, edges of two solar cell modules (2) that are disposed adjacent and spaced from each other on a top face (12) of an attachment base (11) disposed along the edges.

In the third solar cell module attachment structure of the present invention, each edge of the solar cell modules (2) is provided with a frame member (21) including: a holding portion (22) that is formed of an upstanding holding wall (22a), and an upper holding piece (22b) and a lower holding piece (22c) respectively extending from an upper end and a lower end of the holding wall (22a) in the same lateral direction, and that has a quadrangular cross section having one side open so that an edge of a solar cell panel (20) is sandwiched inside the quadrangular shape having one side open; an upright wall portion (23) provided continuously below the holding portion (22); and a bottom portion (24) extending from a lower end of the wall portion (23) in the same direction as the upper holding piece (22b) and the lower holding piece (22c).

In the third solar cell module attachment structure of the present invention, an upper fixing fitting (3a) and a lower fixing fitting (4) are used.

The upper fixing fitting (3a) includes: a pressing plate (31) that is disposed so as to extend across a gap (7) formed between the frame members (21) provided at the facing edges of the two adjacent solar cell modules (2) in a direction in which the solar cell modules (2) are adjacent, such as the right-left direction, and that presses from above the upper holding pieces (22b) of the frame members (21) of the two adjacent solar cell modules (2); and protrusion pieces (32) that are formed at both front and rear edges of the pressing plate (31) so as to protrude downward and that are inserted into the gap (7) from above.

The lower fixing fitting (4) includes an upper plate (40) and a lower plate (50) that vertically sandwich the top face (12) of the attachment base (11), the upper plate (40) is sandwiched between the top face (12) of the attachment base (11) and the bottom portions (24) of the frame members (21) of the two adjacent solar cell modules (2), the upper plate (40) includes holding pieces (41) formed by bending both edges thereof upward, an inner face of one of the holding pieces (41) is abutted by a distal end face (24a) of the bottom portion (24) of the frame member (21) of one of the adjacent solar cell modules (2), and an inner face of the other holding piece (41) is abutted by a distal end face (24a) of the bottom portion (24) of the frame member (21) of the other of the adjacent solar cell modules (2).

In the third solar cell module attachment structure of the present invention, the solar cell modules (2) are attached to the attachment base (11) in the manner described below using the upper fixing fitting (3a) and the lower fixing fitting (4).

Specifically, the two adjacent solar cell modules (2) are attached to the attachment base (11) by inserting, for example, a bolt (8) as a connecting member inserted from above into a pressing plate hole (33) formed in the pressing plate (31) of the upper fixing fitting (3a) into a lower plate connecting hole (51) formed in the lower plate (50) of the lower fixing fitting (4) via the gap (7) formed between the frame members (21) of the two adjacent solar cell modules (2), an upper plate hole (42) formed in the upper plate (40) of the lower fixing fitting (4) and a top face hole (13) formed in the top face (12) of the attachment base (11).

The third solar cell module attachment structure of the present invention employs a structure in which the pressing plate (31) of the upper fixing fitting (3a) presses, from above, the upper holding pieces (22b) of the frame members 21 of two adjacent solar cell modules (2).

Accordingly, in a state in which the solar cell module (2) is attached to the attachment base (11), even if the wind blowing into the backside of the solar cell panel (20) tries to lift the solar cell panel (20) up from below, the pressing plate (31) of the upper fixing fitting (3a) prevents the edge of the solar cell panel 20 from being detached from the holding portion (22) of the frame member (21) holding the solar cell panel 20.

With the third solar cell module attachment structure of the present invention, in the case of using a bolt, for example, it is possible to attach two adjacent solar cell modules (2) to the attachment base (11) with a simple operation of inserting and screwing a bolt (8) inserted from above in the pressing plate hole (33) formed in the pressing plate (31) of the upper fixing fitting (3a) into the lower plate connecting hole (51) of the lower plate (50) of the lower fixing fitting (4) via the gap (7) between the frame members (21), the upper plate hole (42) of the upper plate (40) of the lower fixing fitting (4) and the top face hole (13) of the top face (12) of the attachment base (11). Accordingly, the solar cell modules (2) can be easily attached to the attachment base (11), achieving reduction of the time required for the attachment work.

The third solar cell module attachment structure of the present invention can also be applied to solar cell modules (2a) as described above using frame members (21) including hook pieces (25). In this case, the structure is configured as follows.

Specifically, firstly, a frame member (21a) obtained by providing a hook piece (25) protruding outward from the wall portion (23), with a distal end thereof being bent upward and forming a protruding wall (26), to the wall portion (23) of the frame member (21) of the solar cell module (2) described above is used (the frame member (21a) is used in the solar cell module (2a)).

In such a solar cell module (2a), the pressing plate (31) of the upper fixing fitting (3a) is disposed so as to extend across a gap (7) formed between the protruding walls (26) of the hook pieces (25) of the two solar cell modules (2a) in the direction in which the solar cell modules (2a) are adjacent, instead of being disposed so as to extend across the gap (7) formed between the holding walls (22a) of the frame members (21a) provided at the facing edges of the two adjacent solar cell modules (2a) in the direction in which the solar cell modules (2) are adjacent.

Also, the pressing plate (31) of the upper fixing fitting (3a) presses from above upper end faces of the protruding walls (26) of the hook pieces (25), instead of pressing from above the upper holding pieces (22b) of the frame members (21a) of the two adjacent solar cell modules (2a).

Furthermore, the protrusion pieces (32) of the upper fixing fitting (3a) are inserted into the gap (7) formed between the protruding walls (26) of the hook pieces (25) instead of being inserted into the gap (7) formed between the holding walls (22a) of the frame members (21a) provided at the facing edges of the two adjacent solar cell modules (2a).

The solar cell module attachment structure has substantially the same basic structure as the third solar cell module attachment structure of the present invention described above. Accordingly, the solar cell module attachment structure also has the same actions and effects as those of the third solar cell module attachment structure described above.

The third solar cell module attachment structure of the present invention can also be applied to a case where one of two adjacent solar cell modules (2) in a state in which edges of the solar cell modules (2) can be attached, face-to-face, onto a top face (12) of an attachment base (11) is absent. In this case, the structure is configured as follows.

In other words, this is a case where one of two solar cell modules (2) disposed adjacent and spaced from each other in a state in which edges of the two adjacently disposed solar cell modules (2) can be attached, face-to-face, onto a top face (12) of an attachment base (11) disposed along the edges is absent.

In this case as well, as the solar cell module (2), the same solar cell module (2) as that used in the third solar cell module attachment structure of the present invention can be used.

In this structure, an upper fixing fitting (3b) and a lower fixing fitting (4) are used. As the lower fixing fitting (4), the same lower fixing fitting (4) as that used in the third solar cell module attachment structure of the present invention can be used.

The upper fixing fitting (3b) used in this structure includes a pressing plate (31) that presses from above the upper holding piece (22b) of the frame member (21) provided at the edge of the solar cell module (2); protrusion pieces (32) that are formed so as to be bent downward at edges of the pressing plate (31); an upstanding wall (34) extending downward at an edge of the pressing plate (31) in which the solar cell module (2) is not present; and a bottom portion (35) extending laterally from a lower end of the upstanding wall (34) in a direction opposite to the direction in which the pressing plate (31) is present, and is formed such that either of two side faces (32a) of the protrusion pieces (32) pressing the frame member (21) of the solar cell module (2) in a lateral direction.

In the solar cell module attachment structure described above, the solar cell module (2) is attached to the attachment base (11) in the manner described below using the upper fixing fitting (3b) and the lower fixing fitting (4) described above.

Specifically, the solar cell module (2) is attached to the attachment base (11) by inserting and fixing a bolt (8) inserted from above into a pressing plate hole (33) formed in the pressing plate (31) of the upper fixing fitting (3b) into a lower plate connecting hole (51) formed in the lower plate (50) of the lower fixing fitting (4) via a gap (7) formed between the frame member (21) of the solar cell module (2) and the upstanding wall (34) of the upper fixing fitting (3b), an upper plate hole (42) formed in the upper plate (40) of the lower fixing fitting (4) and a top face hole (13) formed in the top face (12) of the attachment base (11).

The solar cell module attachment structure has substantially the same basic structure as the third solar cell module attachment structure of the present invention described above. Accordingly, the solar cell module attachment structure also has the same actions and effects as those of the third solar cell module attachment structure described above.

In each of the solar cell module attachment structures described above, it is preferable that the top face hole (13) formed in the top face (12) of the attachment base (11) is a long hole that is long in the direction in which the solar cell modules (2) are adjacent. With this configuration, it is possible to easily perform fine adjustment in the process of attaching solar cell modules (2) to the attachment base (11).

Each of the solar cell module attachment structures described above is preferably configured as follows. Specifically, first, a positioning slit (14) for the lower fixing fitting (4) is formed in front of the top face hole (13) in the top face (12) of the attachment base (11).

Then, a downwardly bent positioning piece (43) is formed at a frontal edge of the upper plate (40) of the lower fixing fitting (4), and positioning in the lengthwise direction of the attachment base of the lower fixing fitting (4) is performed by inserting from above the positioning piece (43) into the positioning slit (14) in the top face (12) of the attachment base (11). With this configuration, the attachment work of the solar cell modules (2) to the attachment base (11) can be facilitated.

Also, each of the solar cell module attachment structures described above is preferably configured as follows. Specifically, the lower fixing fitting (4) is configured such that the upper plate (40) and the lower plate (50) of the lower fixing fitting (4) are joined via a joint portion (60) having, in the middle, an easily bendable waist portion (61). According to this configuration, the upper plate (40) and the lower plate (50) of the lower fixing fitting (4) are joined, and thereby they can be handled as a single component, and thus the attachment work of the solar cell modules (2) to the attachment base (11) can be facilitated.

The above solar cell module attachment structure using the lower fixing fitting (4) having the joint portion (60) is preferably configured as follows. Specifically, first, a rear edge of the upper plate (40) and a rear edge of the lower plate (50) of the lower fixing fitting (4) are joined by the joint portion (60), and a connecting portion connecting the upper plate (40) and the joint portion (60) is vertically bent. Also, an attachment aid hole (15) allowing insertion of the joint portion (60) and the lower plate (50) of the lower fixing fitting (4) is formed in the top face (12) of the attachment base (11).

Then, the joint portion (80) and the lower plate (50) of the lower fixing fitting (4) are inserted into the attachment aid hole (15) in the top face (12) of the attachment base (11), with a lower plate frontal edge (50a) inserted first, and thereafter the waist portion (61) of the joint portion (60) of the lower fixing fitting (4) is bent so as to bring the lower plate (50) into close contact with the upper plate (40), whereby the top face (12) of the attachment base (11) is vertically sandwiched between the upper plate (40) and the lower plate (50).

With this configuration, the attachment work of the solar cell modules (2) to the attachment base (11) can be facilitated.

The solar cell module attachment structure using the attachment base (11) having an attachment aid hole (15) in the top face (12) of the attachment base (11) is preferably configured as follows.

Specifically, the attachment aid hole (15) in the top face (12) of the attachment base (11) has a size that allows insertion of the joint portion (60) and the lower plate (50 of the lower fixing fitting (4), with the right-left direction of the lower plate (50) of the lower fixing fitting (4) aligned parallel to the lengthwise direction of the top face (12) of the attachment base (11), and a width in a direction that intersects the lengthwise direction of the attachment aid hole (15) is wider than the width of the joint portion (60) of the lower fixing fitting (4).

Then, the joint portion (60) and the lower plate (50) of the lower fixing fitting (4) are inserted with a direction that intersects the lengthwise direction of the lower plate (50) of the lower fixing fitting (4) aligned parallel to the lengthwise direction of the top face (12) of the attachment base (11), after the insertion, the entire lower fixing fitting (4) is rotated at a right angle about the joint portion (60) as an axis of rotation, and the waist portion (61) of the joint portion (60) of the lower fixing fitting (4) is bent so as to bring the lower plate (50) into close contact with the upper plate (40).

With this configuration, the mounting work of the lower fixing fitting (4) onto the top face (12) of the attachment base (11) can be facilitated. Accordingly, the attachment work of the solar cell modules (2) to the attachment base (11) can be facilitated.

Also, the solar cell module attachment structure using the attachment base (11) having an attachment aid hole (15) in the top face (12) of the attachment base (11) is preferably configured as follows.

Specifically, first, a positioning slit (14) for the lower fixing fitting (4a) is formed in front of the top face hole (13) in the top face (12) of the attachment base (11).

A downwardly bent positioning piece (43) is formed at a frontal edge of the upper plate (40) of the lower fixing fitting (4a), positioning in the front-rear direction of the lower fixing fitting (4a) is performed by inserting from above the positioning piece (43) into the positioning slit (14) in the top face (12) of the attachment base (11) so that a distal end of the positioning piece (43) of the upper plate (40) of lower fixing fitting (4a) inserted into the positioning slit (14) in the top face (12) of the attachment base (11) protrudes downward from the positioning slit (14).

Also, a frontal edge piece (52) having a fitting slit (53) allowing fitting of the distal end, protruding downward from the positioning slit (14), of the positioning piece (43) of the upper plate (40) of the lower fixing fitting (4a) is formed at the lower plate frontal edge (50a) of the lower fixing fitting (4a).

Then, the waist portion (61) of the joint portion (60) of the lower fixing fitting (4a) is bent so as to bring the lower plate (50) into close contact with the upper plate (40) by fitting the distal end, protruding downward from the positioning slit (14), of the positioning piece (43) of the upper plate (40) of the lower fixing fitting (4a) into the fitting slit (53) of the lower plate frontal edge piece (52) of the lower fixing fitting (4).

With this configuration, the waist portion (61) of the joint portion (60) of the lower fixing fitting (4a) can be bent so as to bring the lower plate (50) into close contact with the upper plate (40) so that the lower plate (50) is positioned near the center immediately below the upper plate (40). Accordingly, the top face (12) of the attachment bar (11) of the stand (10) can be sandwiched by the lower plate (50) and upper plate (40) of the lower fixing fitting (4a) with accuracy and ease. Therefore, the attachment work of the solar cell modules (2) to the attachment base (11) can be facilitated.

A solar cell apparatus according to the present invention will be described next.

A first solar cell apparatus according to the present invention is a solar cell apparatus in which edges of adjacent solar cell modules (2) are attached pairwise onto an attachment base (11) including a top face (12) disposed along the edges.

The first solar cell apparatus of the present invention includes: a frame member (21) provided at each edge of the solar cell modules (2); an upper fixing fitting (3a) provided between the frame members (21) of the two adjacent solar cell modules (2); a lower fixing fitting (4) including an upper plate (40) that is held on the top face (12) of the attachment base (11), and a connecting member (8) that is inserted between the frame members (21) of the two adjacent solar cell modules (2) to connect the upper fixing fitting (3a) and the lower fixing fitting (4).

In the first solar cell apparatus of the present invention, the upper plate (40) includes holding pieces (41) formed by bending both edges thereof, an inner face of one of the holding pieces (41) is abutted by a part of the frame member (21) of one of the adjacent solar cell modules (2), and an inner face of the other holding piece (41) is abutted by a part of the frame member (21) of the other of the adjacent solar cell modules (2).

On the other hand, a second solar cell apparatus according to the present invention is also a solar cell apparatus in which edges of adjacent solar cell modules (2) are attached pairwise onto an attachment base (11) including a top face (12) disposed along the edges, similar to the first solar cell apparatus of the present invention.

The second solar cell apparatus of the present invention includes: a frame member (21) provided at each edge of the solar cell modules (2) and including a holding portion (22) holding an edge of a solar cell panel (20), an upright wall portion (23) provided continuously below the holding portion (22), and a bottom portion (24) provided at a lower end of the wall portion (23); an upper fixing fitting (3a) provided between the frame members (21) of the two adjacent solar cell modules (2); a lower fixing fitting (4) including an upper plate (40) and a lower plate (50) that vertically sandwich the top face (12) of the attachment base (11); and a connecting member (8) that connects the upper fixing fitting (3a) and the lower fixing fitting (4) via a gap (7) formed between the frame members (21) of the two adjacent solar cell modules (2).

In the second solar cell apparatus of the present invention, the upper plate (40) includes holding pieces (41) formed by bending both edges thereof, an inner face of one of the holding pieces (41) is abutted by a part of the frame member (21) of one of the adjacent solar cell modules (2), and an inner face of the other holding piece (41) is abutted by a part of the frame member (21) of the other of the adjacent solar cell modules (2).

Effects of the Invention

With the first solar cell module attachment structure of the present invention, the lower fixing fitting (4) fixes the bottom portion (24) of the frame member (21) on the top face (12) of the attachment base (11), and the edges of the two solar cell modules (2) are positioned relative to each other, and thus the resistance to up-blowing wind load can be enhanced. In some cases, the upper fixing fitting (3a) may be omitted, thereby achieving simplified attachment work and low cost.

On the other hand, the second and third solar cell module attachment structures of the present invention employ a structure in which the pressing plate (31) of the upper fixing fitting (3a) presses, from above, the upper holding pieces (22b) of the frame members 21 of two adjacent solar cell modules (2).

Accordingly, in a state in which the solar cell module (2) is attached to the attachment base (11), even if the wind blowing into the backside of the solar cell panel (20) tries to lift the solar cell panel (20) up from below, the pressing plate (31) of the upper fixing fitting (3a) prevents the edge of the solar cell panel 20 from being detached from the holding portion (22) of the frame member (21) holding the solar cell panel 20.

Also, with the solar cell module attachment structure described above, it is possible to attach two adjacent solar cell modules (2) to the attachment base (11) with a simple operation of inserting and fixing a bolt (8) inserted from above in the pressing plate hole (33) formed in the pressing plate (31) of the upper fixing fitting (3a) into the lower plate connecting hole (51) formed in the lower plate (50) of the lower fixing fitting (4) via the gap (7) between the frame members (21), the upper plate hole (42) formed in the upper plate (40) of the lower fixing fitting (4), and the top face hole (13) formed in the top face (12) of the attachment base (11). Accordingly, the solar cell modules (2) can be easily attached to the attachment base (11), achieving reduction of the time required for the attachment work.

BRIEF DESCRIPTION OF DRAWINGS

FIG. 1 is an exterior view of a solar cell apparatus to which a solar cell module attachment structure according to an embodiment of the present invention is applied

FIG. 2 is a side view of the solar cell apparatus to which the solar cell module attachment structure according to the embodiment of the present invention is applied.

FIG. 3 is a cross-sectional view showing a configuration of an edge of a solar cell module used in a solar cell module center attachment structure according to the embodiment of the present invention.

FIG. 4(a) is a perspective view of the solar cell module center attachment structure according to the embodiment of the present invention as viewed from the solar cell module side, and FIG. 4(b) is a perspective view of the same as viewed from the underside of the top face of the attachment bar of a stand.

FIG. 5 is a cross-sectional view of the solar cell module center attachment structure according to the embodiment of the present invention.

FIG. 6 is a perspective view showing an exterior of an attachment bar of a stand used in the solar cell module attachment structure according to the embodiment of the present invention.

FIG. 7 is a perspective view showing an exterior of an upper fixing fitting used in the solar cell module center attachment structure according to the embodiment of the present invention.

FIG. 8 is a perspective view showing an exterior of a lower fixing fitting used in the solar cell module attachment structure according to the embodiment of the present invention.

FIG. 9 is a perspective view showing a process of attaching the lower fixing fitting used in the solar cell module attachment structure according to the embodiment of the present invention (a first step).

FIG. 10 is a perspective view showing the process of attaching the lower fixing fitting used in the solar cell module attachment structure according to the embodiment of the present invention (a second step).

FIG. 11 is a perspective view showing the process of attaching the lower fixing fitting used in the solar cell module attachment structure according to the embodiment of the present invention (a third step).

FIG. 12 is a perspective view showing the process of attaching the lower fixing fitting used in the solar cell module attachment structure according to the embodiment of the present invention (a fourth step).

FIG. 13 is a plan view showing a state in which the lower fixing fitting used in the solar cell module attachment structure according to the embodiment of the present invention has been mounted on the top face.

FIG. 14 is a front view showing the state in which the lower fixing fitting used in the solar cell module attachment structure according to the embodiment of the present invention has been mounted on the top face.

FIG. 15 is a side view showing the state in which the lower fixing fitting used in the solar cell module attachment structure according to the embodiment of the present invention has been mounted on the top face.

FIG. 16 is a perspective view showing the state in which the lower fixing fitting used in the solar cell module attachment structure according to the embodiment of the present invention has been mounted on the top face.

FIG. 17 is a perspective view showing the state in which the lower fixing fitting used in the solar cell module attachment structure according to the embodiment of the present invention has been mounted on the top face, showing only the shape of the lower fixing fitting.

FIG. 18 is a perspective view showing an exterior of another lower fixing fitting 4a used in the solar cell module attachment structure according to the embodiment of the present invention

FIG. 19 is a perspective view showing the lower fixing fitting 4a used in the solar cell module attachment structure according to the embodiment of the present invention in the state in which the lower fixing fitting 4a has been mounted on the top face 12 of the attachment bar 11 of the stand 10.

FIG. 20 is a perspective view showing an exterior of an upper fixing fitting used in a solar cell module side attachment structure according to the embodiment of the present invention.

FIG. 21 is a cross-sectional view of the solar cell module side attachment structure according to the embodiment of the present invention.

FIG. 22 is a cross-sectional view showing a configuration of an edge of a solar cell module using a frame member provided with a hook piece according to the embodiment of the present invention.

FIG. 23 is a partial cross-sectional view of a solar cell module center attachment structure for the solar cell modules using a frame member provided with a hook piece according to the embodiment of the present invention.

FIG. 24 is a perspective view showing an exterior of a lower fixing fitting 4b having bent U-shaped holding pieces used in a solar cell module attachment structure according to the embodiment of the present invention.

FIG. 25(a) is a perspective view of a solar cell module attachment structure using the lower fixing fitting 4b having bent U-shaped holding pieces according to the embodiment of the present invention as viewed from the solar cell module side, and FIG. 25(b) is a partial cross-sectional view of the same.

FIG. 26 is a cross-sectional view showing a configuration of an edge of a solar cell module using a frame member having a bottom portion without a fin according to the embodiment of the present invention.

FIG. 27 is a perspective view showing an exterior of a lower fixing fitting 4e having L-shaped holding pieces used in the solar cell module attachment structure according to the embodiment of the present invention.

FIG. 28 is a cross-sectional view showing a solar cell module attachment structure using the lower fixing fitting 4c having L-shaped holding pieces according to the embodiment of the present invention.

FIG. 29(a) is a perspective view of a solar cell module attachment structure using only a lower fixing fitting 4d according to the embodiment of the present invention, as viewed from the solar cell module side, and FIG. 29(b) is a perspective view of the same as viewed from the underside of the top face of the attachment bar of the stand.

FIG. 30 is a partial cross-sectional view showing the solar cell module attachment structure using only the lower fixing fitting 4d according to the embodiment of the present invention.

FIG. 31(a) is a perspective view showing an exterior of an upper plate 40 of the lower fixing fitting 4d used in the solar cell module attachment structure using only the lower fixing fitting 4d according to the embodiment of the present invention, and FIG. 31(b) is a perspective view showing an exterior of a lower plate 50 of the same.

FIG. 32 is a perspective view showing an exterior of an upper plate of a lower fixing fitting used in the solar cell module attachment structure according to the embodiment of the present invention.

FIG. 33 is a perspective view showing an exterior of a lower plate of the lower fixing fitting used in the solar cell module attachment structure according to the embodiment of the present invention.

FIG. 34 is a perspective view of a solar cell module center attachment structure according to another embodiment of the present invention.

FIG. 35 is a perspective view of a solar cell module side attachment structure according to another embodiment of the present invention.

MODES FOR CARRYING OUT THE INVENTION

General Description of Solar Cell Module Attachment Structure

Figure 1:
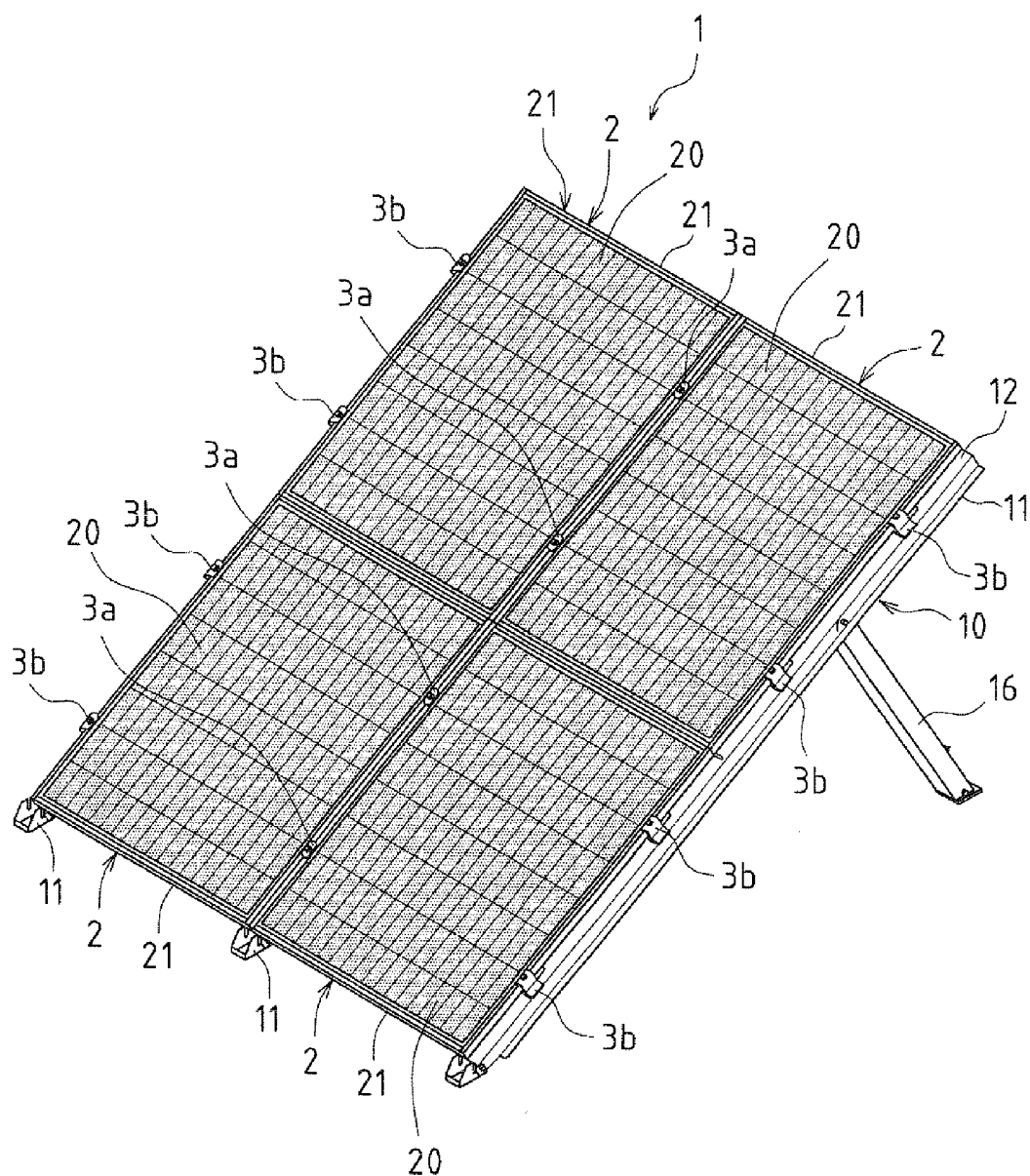
[FIG. 1]

A solar cell module attachment structure according to an embodiment of the present invention will be described next with reference to the drawings. FIG. 1 is an exterior view of a solar cell apparatus 1 to which the solar cell module attachment structure according to the present embodiment is applied, and FIG. 2 is a side view of the solar cell apparatus 1.

Figure 2:
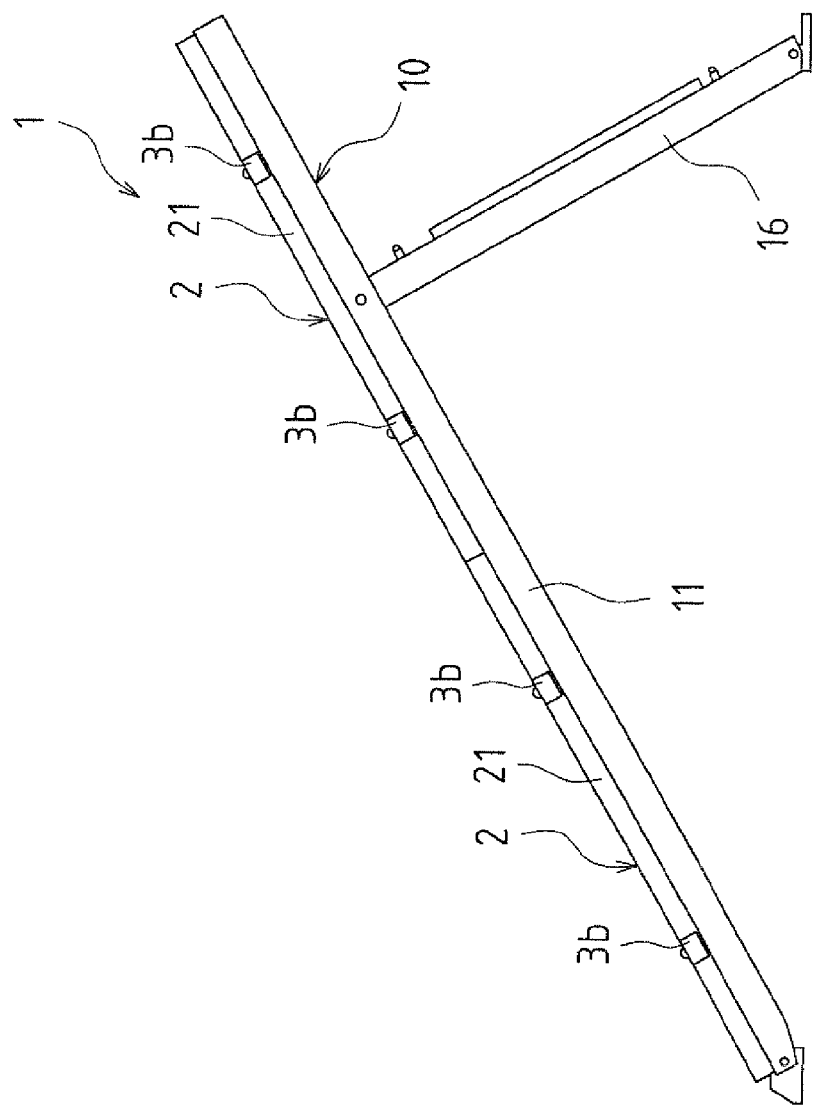
[FIG. 2]

In FIGS. 1 and 2, four solar cell modules 2 are attached onto three stands 10, thus constituting the solar cell apparatus 1. Each solar cell module 2 is constituted by a solar cell panel 20 and frame members 21 for holding the solar cell panel 20.

Each stand 10 is constituted by an attachment bar 11 (corresponding to the attachment base mentioned above) and a vertical bar 16, and is formed such that, as shown in FIG. 2, the attachment bar 11 is supported by the vertical bar 16. Specifically, one stand 10 is formed by fixing, to the upper one-quarter in the lengthwise direction of an obliquely disposed attachment bar 11, the distal end of the vertical bar 16 that is disposed at an incline in a direction opposite to the inclination of the attachment bar 11.

As described above, in the solar cell apparatus 1, four solar cell modules 2 are attached at positions corresponding to the left edge, the right edge and the center of the solar cell apparatus 1, using three stands 10 disposed parallel to each other.

In other words, two solar cell modules 2 are arranged one directly above the other between an attachment bar 11 of a stand 10 disposed at the left edge and an attachment bar 11 of a stand 10 disposed at the center and between the attachment bar 11 of the stand 10 disposed at the center and an attachment bar 11 of a stand 10 disposed at the right edge so as to bridge the bars, and the edges of each solar cell module 2 are placed and attached onto top faces 12 of the attachment bars 11 of the stands 10.

In two of the three stands 10, namely, the attachment bar 11 of the stand 10 disposed at the left edge and the attachment bar 11 of the stand 10 disposed at the right edge, an edge of only one solar cell module 2 is mounted and attached, in the right-left direction, onto the top face 12 of the attachment bar 11, whereas in the stand 10 disposed at the center, the edges of two solar cell modules 2 are placed and attached, in the right-left direction, on the top face 12 of the attachment bar 11.

The solar cell module attachment structure according to the present embodiment is characterized by the configuration described above in which an edge of a solar cell module 2 placed on the top face 12 of the attachment bar 11 of a stand 10 is attached to the attachment bar of the stand 10.

Next, in the solar cell apparatus 1, the configuration in which an edge of a solar cell module 2 placed on the top face 12 of the attachment bar 11 of a stand 10 is attached to the attachment bar 11 of the stand 10 will be described.

In the following description, it is assumed that the solar cell panels 20 of the solar cell modules 2 of the solar cell apparatus 1 are disposed horizontally. Herein, the lengthwise direction of the attachment bar 11 of the stand 10 is referred to as the "front-rear direction". The direction in which the three stands 10 are disposed parallel to each other is referred to as the "right-left direction". The direction toward which the surface of the solar cell module 2 is facing is referred to as "upward", and the direction toward which the underside of the solar cell module 2 is facing is referred to as "downward".

As described above, the solar cell apparatus 1 has an attachment structure in which the edges of two solar cell modules 2 are placed and attached in the right-left direction, and there are two types of attachment structures.

One is the attachment structure for the attachment bar 11 of the stand 10 disposed at the center of the solar cell apparatus 1, in which the edges of two solar cell modules 2 are placed and attached onto the attachment bar 11 of the stand 10 in the right-left direction. The other is the attachment structure for the attachment bar 11 of the stand 10 disposed at the left or right edge of the solar cell apparatus 1, in which an edge of one solar cell module 2 is placed and attached onto the attachment bar 11 of the stand 10 in the right-left direction. The former will be hereinafter referred to as the center attachment structure, and the latter will be referred to as the side attachment structure. The center attachment structure will be described first, and thereafter the side attachment structure will be described.

Description of Center Attachment Structure

The center attachment structure will be described first. The center attachment structure is a solar cell module attachment structure with which the edges of two solar cell modules 2 that are disposed adjacent in the right-left direction and spaced from each other are attached, face-to-face, onto the top face 12 of an attachment bar 11 that is long, for example, in the front-rear direction and disposed along the edges.

Figure 3:
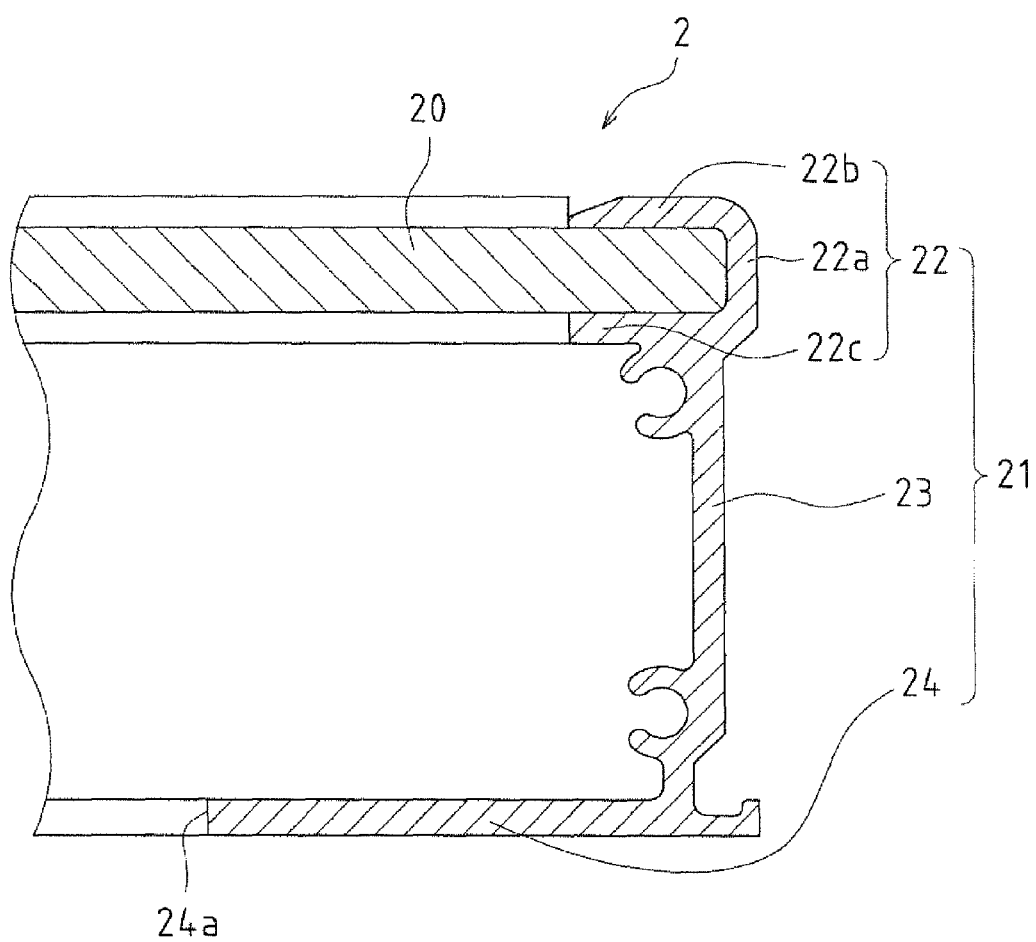
[FIG. 3]

FIG. 3 is a cross-sectional view showing a configuration of an edge of a solar cell module 2 used in the center attachment structure. As shown in FIG. 3, the solar cell module 2 used in the center attachment structure is constituted by a solar cell panel 20 and a frame member 21 for holding the solar cell panel 20. The configuration of the solar cell module 2 is also applied to solar cell modules 2 used in the side attachment structure, which will be described later.

In FIG. 3, the frame member 21 is constituted by a holding portion 22, a wall portion 23 provided continuously and upright below the holding portion 22 and a bottom portion (bottom piece) 24 extending from the lower end of the wall portion 23 in the same direction as an upper holding piece 22b and a lower holding piece 22c.

The holding portion 22 is formed by an upright holding wall 22a, and the upper holding piece 22b and the lower holding piece 22c that extend from the upper end and the lower end of the holding wall 22a in the same lateral direction, and has a quadrangular cross section having one side open. An edge of the solar cell panel 20 is sandwiched in the quadrangular shape having one side open.

FIG. 4(a) is a perspective view of a state in which the edges of two solar cell modules 2 arranged in the right-left direction are placed and attached onto the attachment bar 11 of the centrally disposed stand 10 in the solar cell apparatus 1 as viewed from the solar cell module 2 side. FIG. 4(b) is a perspective view of the same as viewed from the underside of the top face 12 of the attachment bar 11 of the stand 10. FIG. 5 is a cross-sectional view of the same.

In FIGS. 4(a), 4(b) and 5, in the attachment bar 11 of the centrally disposed stand 10 in the solar cell apparatus 1, two adjacent solar cell modules 2 are attached onto the top face 12 of the attachment bar 11 of the stand 10 by using an upper fixing fitting 3a, a lower fixing fitting 4 and a bolt as a connecting member 8. Next, the top face 12 of the attachment bar 11 of the stand 10, the upper fixing fitting 3a and the lower fixing fitting 4 will be described.

Figure 6:
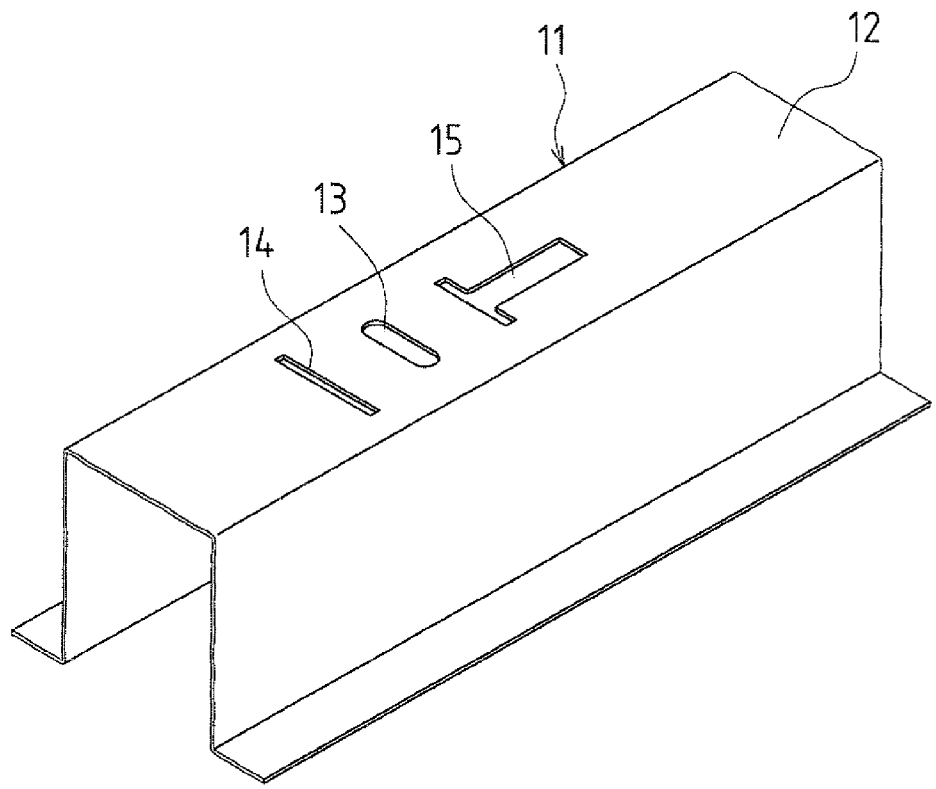
[FIG. 6]

The top face 12 of the attachment bar 11 of the stand 10 will be described first. The top face 12 of the attachment bar 11 of the stand 10 is provided with a top face hole 13, an attachment aid hole 15 for attachment of the lower fixing fitting (4), and a positioning slit 14. FIG. 6 is a perspective view showing an exterior of the attachment bar 11 having the top face 12.

The attachment aid hole 15 is T-shaped, and an I-shaped portion at the center of the T shape is sized as follows. Specifically, the I-shaped portion is sized to allow insertion of a joint portion (60) and a lower plate (50) of the lower fixing fitting (4), which will be described later, with the right-left direction of the lower plate (50) aligned parallel to the lengthwise direction of the top face (12) of the attachment base (11). The I-shaped portion at the center of the T shape has a width in the right-left direction slightly wider than the width of the joint portion (60) of the lower fixing fitting (4), which will be described later.

A narrow portion at the top that is perpendicular to the I-shaped portion at the center of the T-shaped attachment aid hole 15 and that is long in the right-left direction is formed to allow fine adjustment when the lower fixing fitting (4) is attached to the top face 12 of the attachment bar 11, which will be described later.

The top face hole 13 is a hole for insertion of the bolt 8. The top face hole 13 is a long hole that is long in the right-left direction, and is formed to allow fine adjustment when the bolt 8 is inserted. The positioning slit 14 has a shape that is long in the right-left direction. A positioning piece 43 formed at a frontal edge of the upper plate 40 of the lower fixing fitting 4 by being bent downward, which will be described later, is inserted into the positioning slit 14. The positioning slit 14 is formed longer than the positioning piece 43 to also allow fine adjustment when the positioning piece 43 is inserted.

As the connecting member 8, other than a bolt, a connecting pin may be used. To fix the lower portion, other than a nut, a tapping plate, a speed nut or the like may be used.

Figure 7:
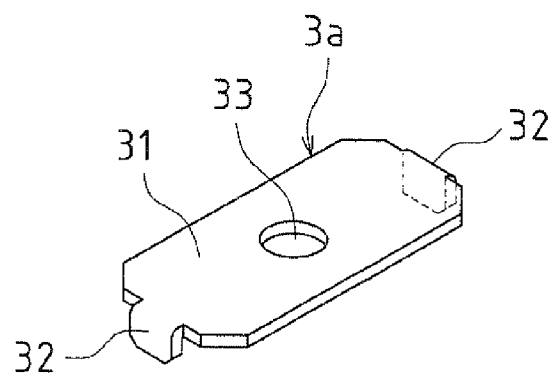
[FIG. 7]

Next, the upper fixing fitting 3a will be described. FIG. 7 is a perspective view showing an exterior of the upper fixing fitting 3a. The upper fixing fitting 3a is formed to include protrusion pieces 32 formed so as to protrude downward at the front and rear edges of a flat pressing plate 31 and a pressing plate hole 33 vertically penetrating the pressing plate 31 at the center thereof.

The pressing plate 31 is used to press, from above, the frame members 21 provided at the edges of two solar cell modules 2 that are disposed adjacent and spaced from each other on the top face 12 of the attachment bar 11 of the stand 10. The pressing plate hole 33 is a hole for insertion of the bolt 8.

The protrusion pieces 32 of the upper fixing fitting 3a are inserted into a gap 7 formed between the frame members 21 provided at the facing edges of the two solar cell modules 2 disposed adjacent and spaced from each other.

Figure 8:
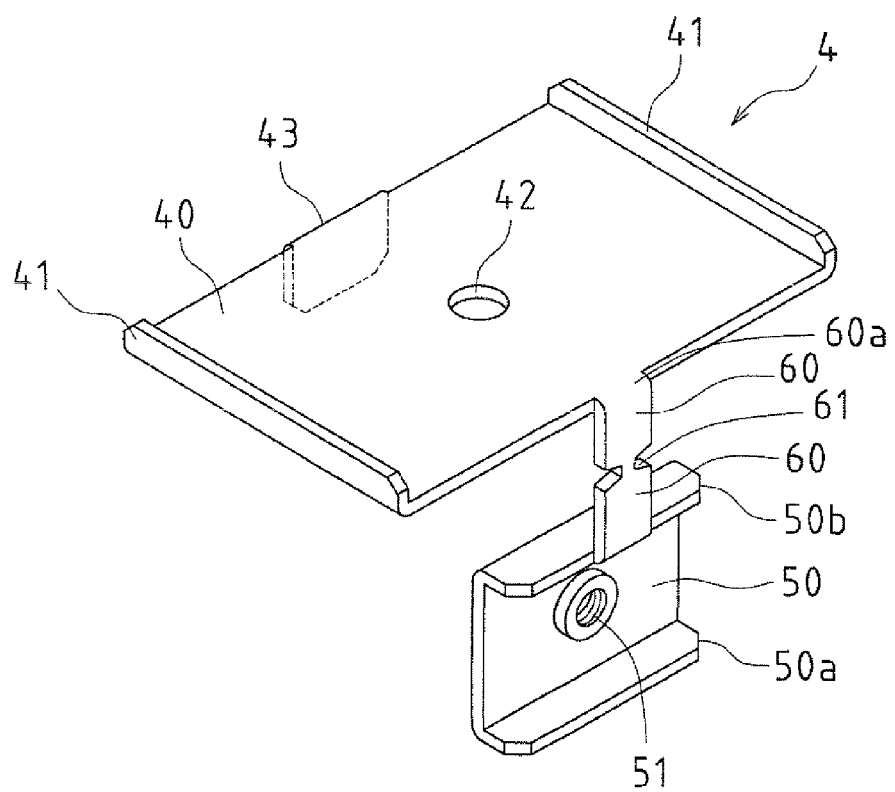
[FIG. 8]

Next, the lower fixing fitting 4 will be described. FIG. 8 is a perspective view showing an exterior of the lower fixing fitting 4. The lower fixing fitting 4 is constituted by the upper plate 40, the lower plate 50 and the joint portion 60 that joins the upper plate 40 and the lower plate 50. More specifically, a rear edge 40a of the upper plate 40 of the lower fixing fitting 4 and a rear edge (lower plate rear wall) 50b of the lower plate 50 are joined by the joint portion 60, and a connecting portion connecting the upper plate 40 and the joint portion 60 is vertically bent.

The joint portion 60 is provided with, in the middle thereof, a waist portion 61 capable of being easily bent. The lower fixing fitting 4 is used by being mounted on the top face 12 of the attachment bar 11 of the stand 10 when solar cell modules 2 are attached to the attachment bar 11 of the stand 10.

Between the lower plate 50 and the joint portion 60 of the lower fixing fitting 4 is formed the lower plate rear wall 50b bent vertically at the rear edge of the lower plate 50 and a lower plate frontal wall 50a bent vertically at the frontal edge of the lower plate 50 of the lower fixing fitting 4.

Also, holding pieces 41 bent upward are formed at the right and left edges of the upper plate 40 of the lower fixing fitting 4. The upwardly bent holding pieces 41 are used in a state in which the lower fixing fitting 4 is mounted on the top face 12 of the attachment bar 11 of the stand 10.

Specifically, in the state in which the lower fixing fitting 4 is mounted on the top face 12 of the attachment bar 11 of the stand 10, the inner face of the left side holding piece 41 of the holding pieces 41 formed at the right and left edges of the upper plate 40 of the lower fixing fitting 4 is abutted by a distal end face 24a of the bottom portion 24 of the frame member 21 of the left side solar cell module 2 of two solar cell modules 2 disposed adjacent and spaced from each other on the top face 12 of the attachment bar 11 of the stand 10. Likewise, the inner face of the right side holding piece 41 is abutted by the distal end face 24a of the bottom portion 24 of the frame member 21 of the adjacent right side solar cell module 2. The holding pieces 41 may be formed in an L shape by being bent upward, or in a U shape by being bent upward and folded back. In the case of the holding pieces 41 formed into a U shape, each holding piece 41 preferably surrounds and fits a part of the bottom portion 24. By inserting the bottom portion 24 into the U-shaped holding pieces, the bottom portion 24 itself can be fixed against vertical displacement, obtaining a structure more resistant to wind loads and the like. The structure for causing the holding pieces 41 and the bottom portion 24 to abut each other may be a structure in which, for example, catch grooves as recess portions are provided in a part of the bottom of the bottom portion 24, and the holding pieces 41 are latched to the recess portions.

At the frontal edge of the upper plate 40 of the lower fixing fitting 4, the downwardly bent positioning piece 43 is formed. Furthermore, a vertically penetrating upper plate hole 42 is formed at the center of the upper plate 40 of the lower fixing fitting 4, and the lower plate 50 of the lower fixing fitting 4 is provided with a lower plate connecting hole 51. The upper plate hole 42 formed in the upper plate 40 of the lower fixing fitting 4 is a hole for insertion of the bolt 8, and the lower plate connecting hole 51 formed in the lower plate 50 of the lower fixing fitting 4 is, for example, a screw hole for insertion of the bolt 8 as a connecting member.

Next, an attachment structure assembling method in the attachment bar 11 of the stand 10 disposed at the center of the solar cell apparatus 1 employing the center attachment structure will be described. As the assembling method in the center attachment structure, firstly, the lower fixing fitting 4 is mounted onto the top face 12 of the attachment bar 11 of the stand 10.

FIGS. 9 to 12 show a process of attaching the lower fixing fitting 4 to the top face 12 of the attachment bar 11 of the stand 10. It should be noted that, in FIGS. 9 to 12, the lower fixing fitting 4 is shown being rotated by 180° about the joint portion 60 serving as the axis of rotation from that of FIG. 8.

Figure 9:
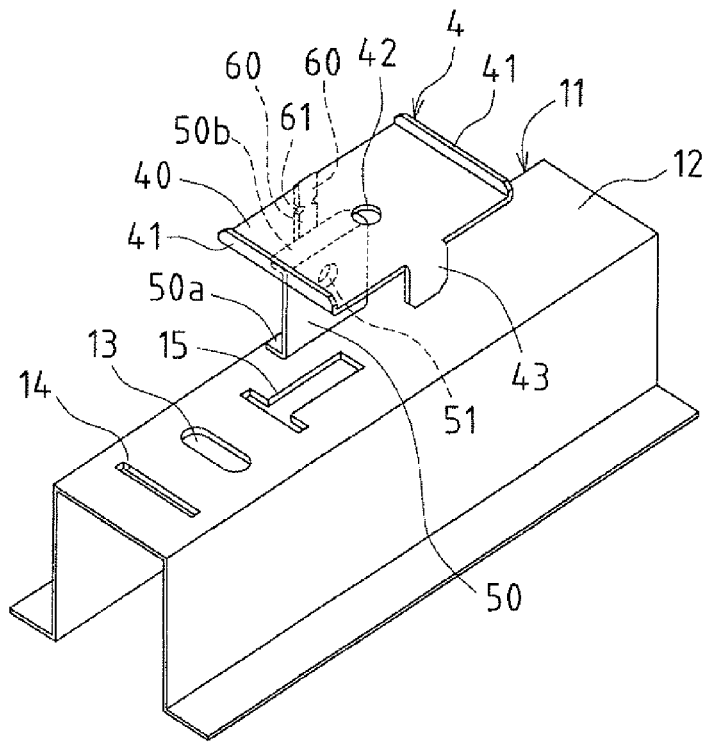
[FIG. 9]
Figure 10:
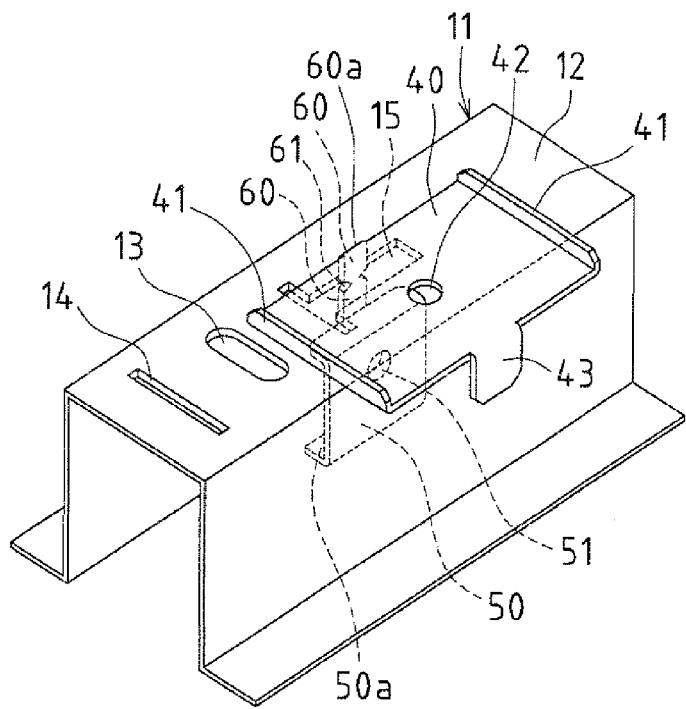
[FIG. 10]

In FIGS. 9 to 12, firstly, the lower fixing fitting 4 is oriented such that the right-left direction of the lower plate 50 of the lower fixing fitting 4 is parallel to the lengthwise direction of the top face 12 of the attachment base 11 (FIG. 9). Then, the lower plate 50 and the joint portion 60 of the lower fixing fitting 4 are inserted into the attachment aid hole 15 formed in the top face 12 of the attachment bar 11 of the stand 10 by inserting the lower plate frontal edge 50a first (FIG. 10).

Figure 11:
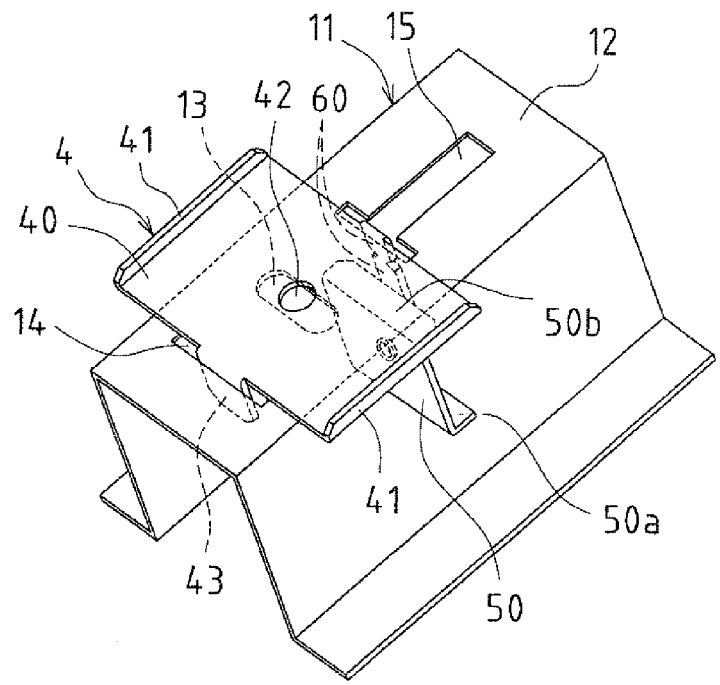
[FIG. 11]

After completing insertion of the lower plate 50 and the joint portion 60, the entire lower fixing fitting 4 is rotated at a right angle about the joint portion 60 serving as the axis of rotation (FIG. 11). Then, the positioning piece 43 of the lower fixing fitting 4 is inserted into the positioning slit 14 formed in the top face 12 of the attachment bar 11 of the stand 10 to position the lower fixing fitting 4 in the front-rear direction.

Figure 12:
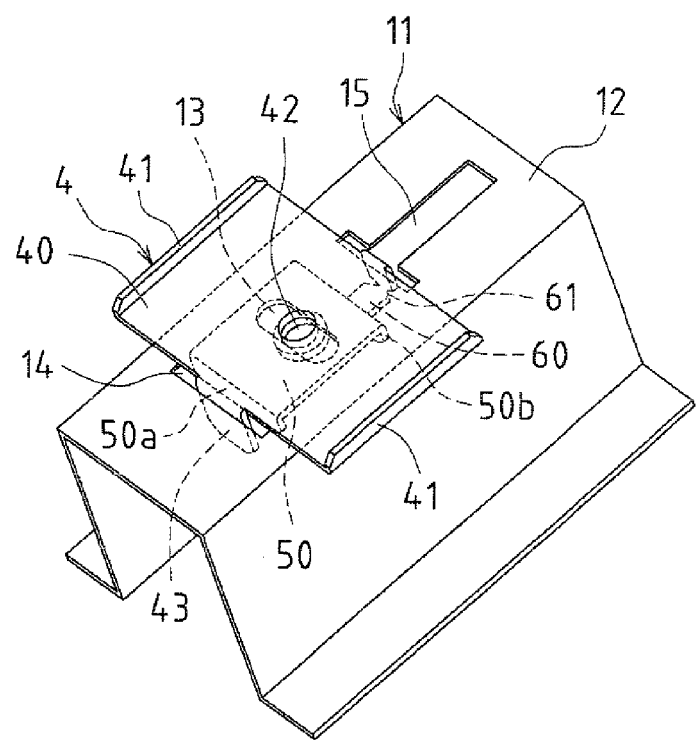
[FIG. 12]

Then, the waist portion 61 of the joint portion 60 of the lower fixing fitting 4 is bent so as to bring the lower plate 50 into close contact with the upper plate 40, whereby the top face 12 of the attachment bar 11 is vertically sandwiched by the upper plate 40 and the lower plate 50 (FIG. 12).

Figure 13:
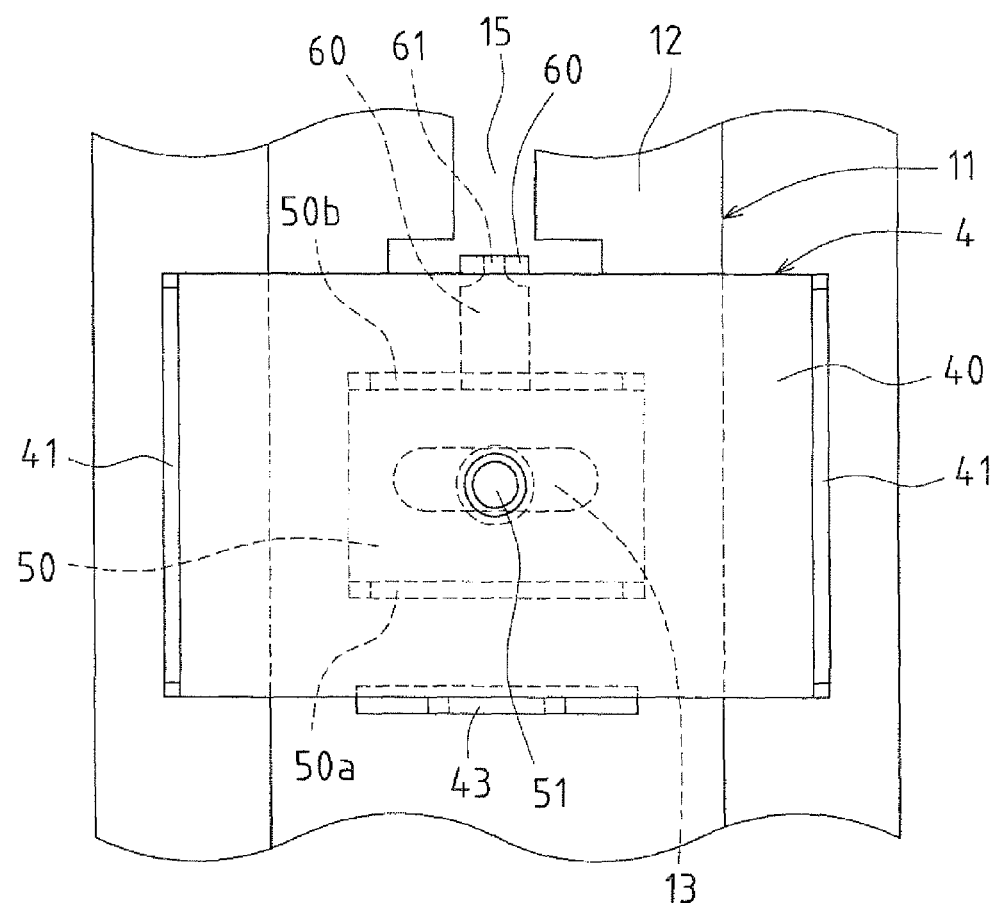
[FIG. 13]
Figure 14:
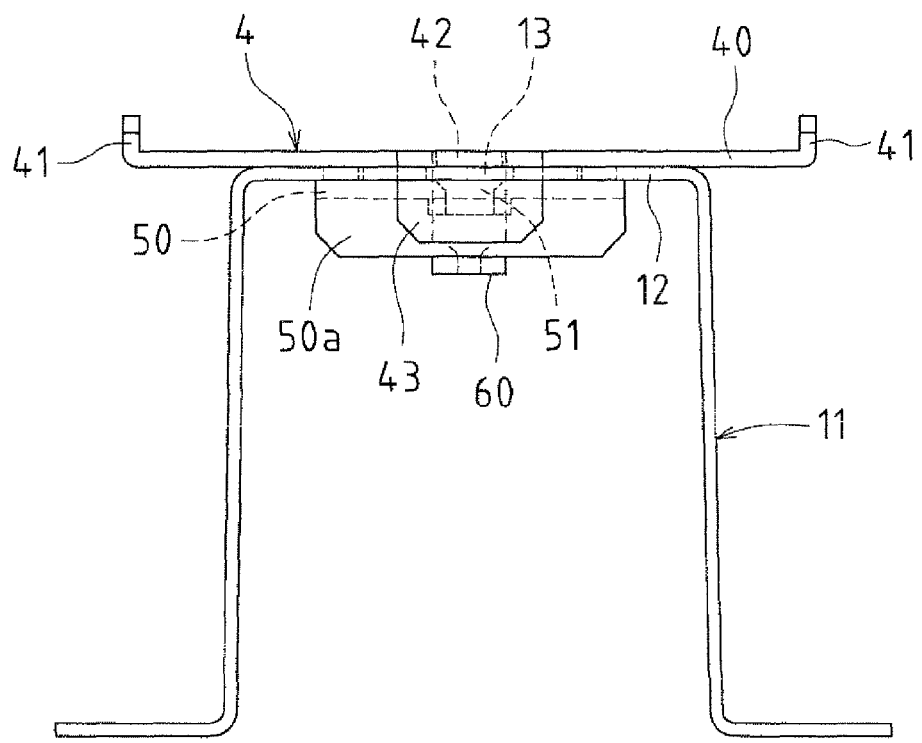
[FIG. 14]
Figure 15:
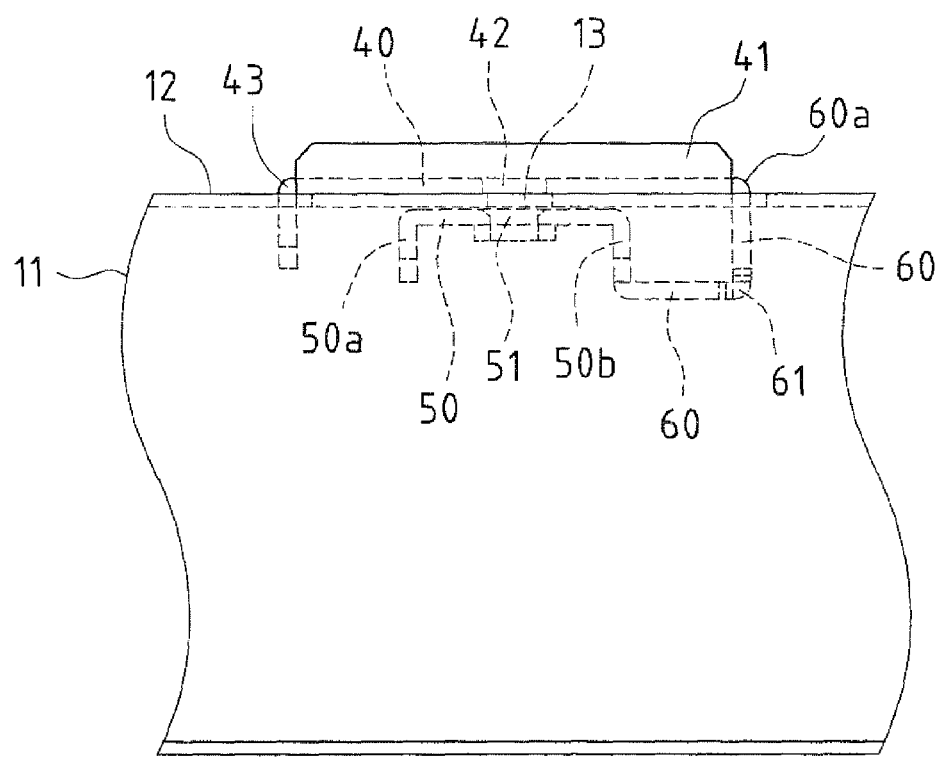
[FIG. 15]
Figure 16:
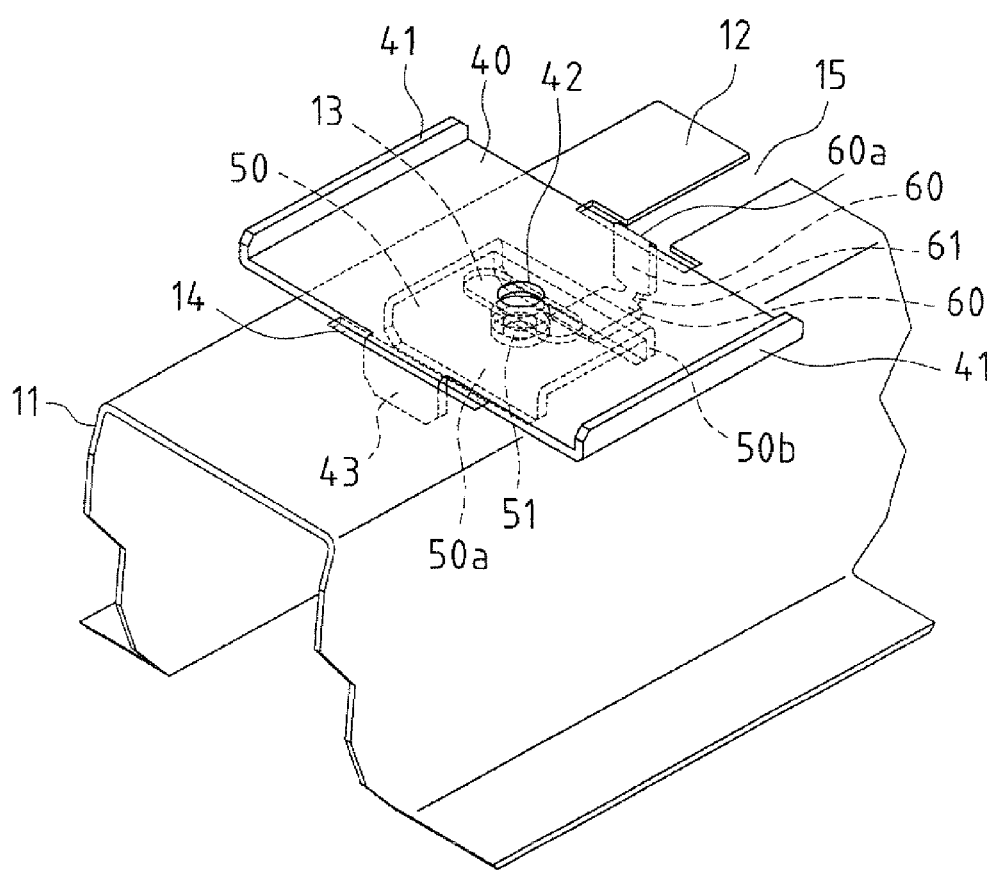
[FIG. 16]
Figure 17:
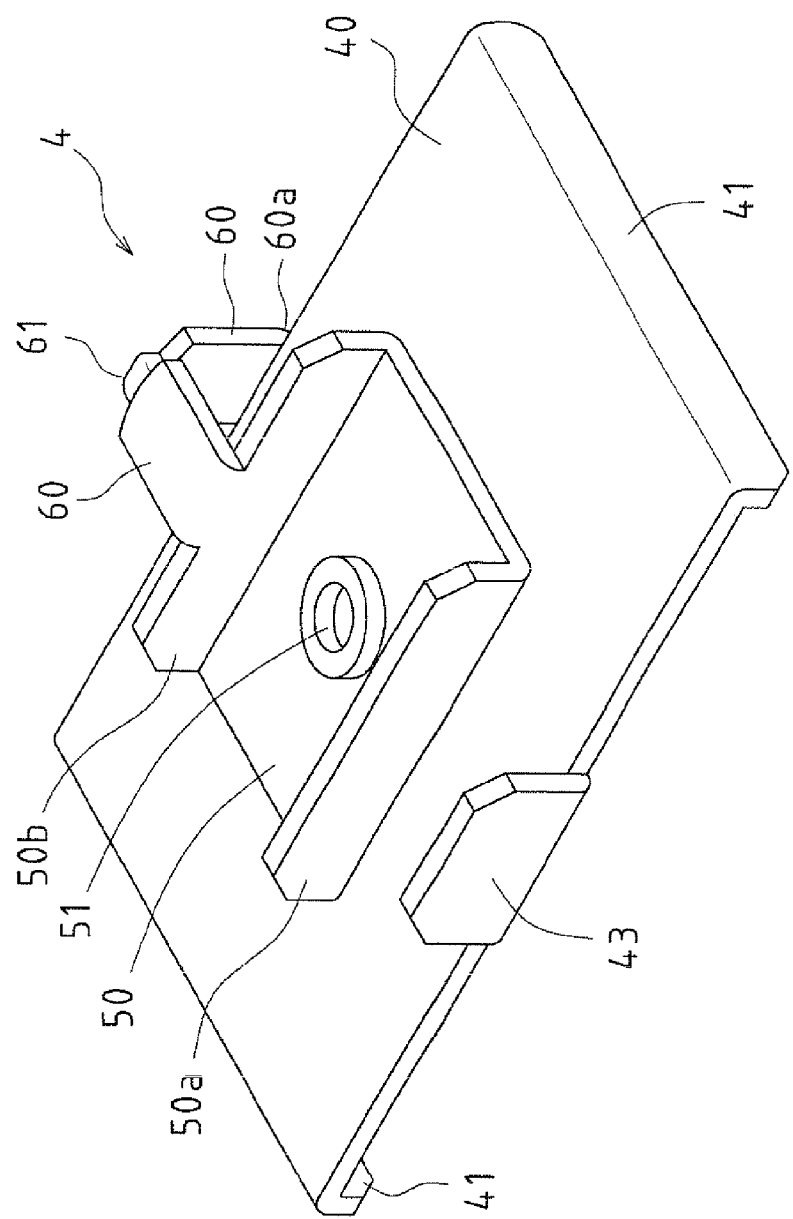
[FIG. 17]

FIGS. 13 to 16 show a state in which the lower fixing fitting 4 has been mounted on the top face 12. Specifically, FIG. 13 is a plan view showing a state in which the lower fixing fitting 4 has been mounted on the top face 12. FIG. 14 is a front view of the same, FIG. 15 is a side view of the same, and FIG. 16 is a perspective view of the same. FIG. 17 is a perspective view showing the state in which the lower fixing fitting 4 has been mounted on the face 12, showing only the shape of the lower fixing fitting 4.

When mounting of the lower fixing fitting 4 onto the top face 12 of the attachment bar 11 of the stand 10 is completed, two solar cell modules 2 are installed next such that the edges of the frame members 21 of the two solar cell modules 2 are adjacent and spaced apart from each other on the lower fixing fitting 4 mounted on the top face 12 of the attachment bar 11 of the stand 10.

Figure 4:
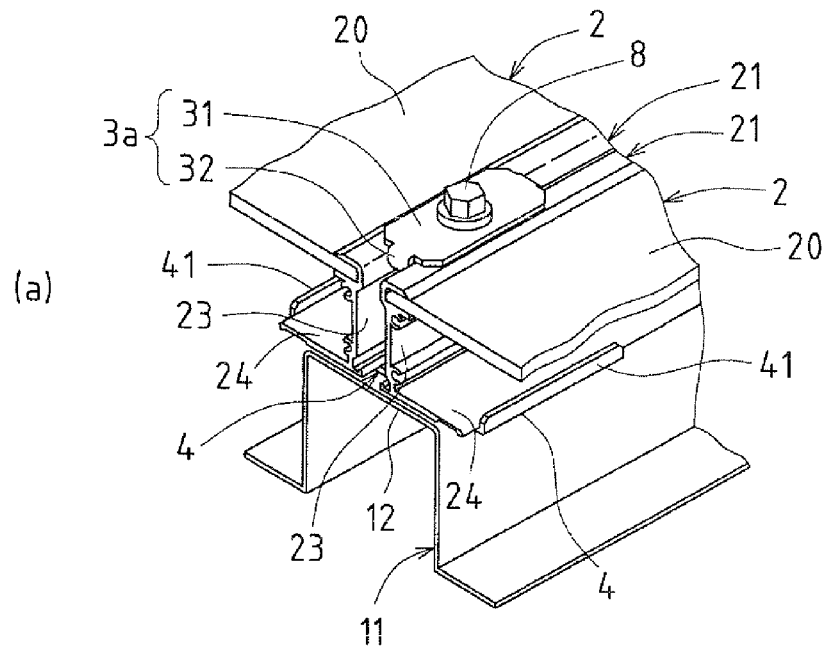
[FIG. 4]
Figure 4:
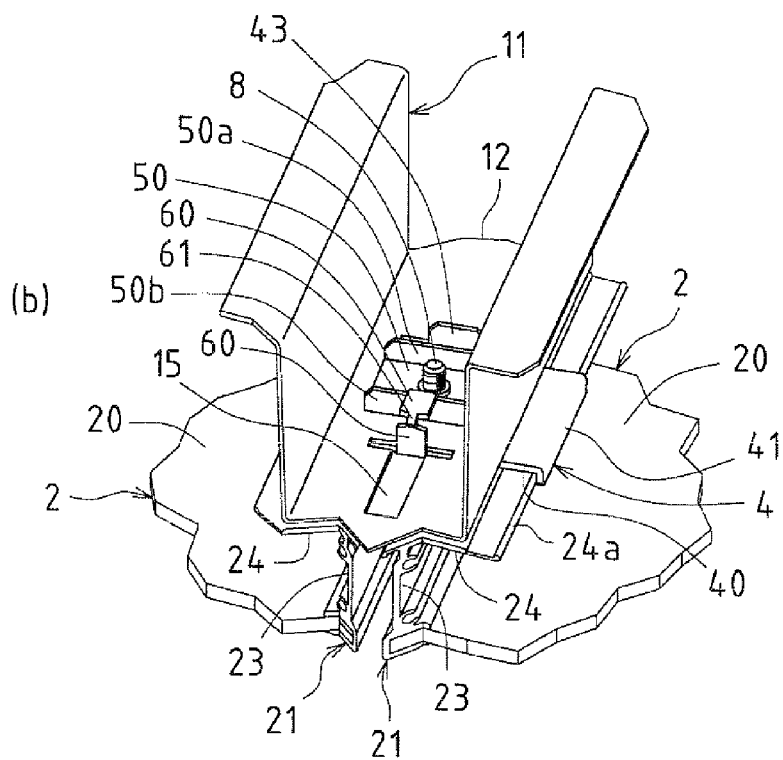
Figure 5:
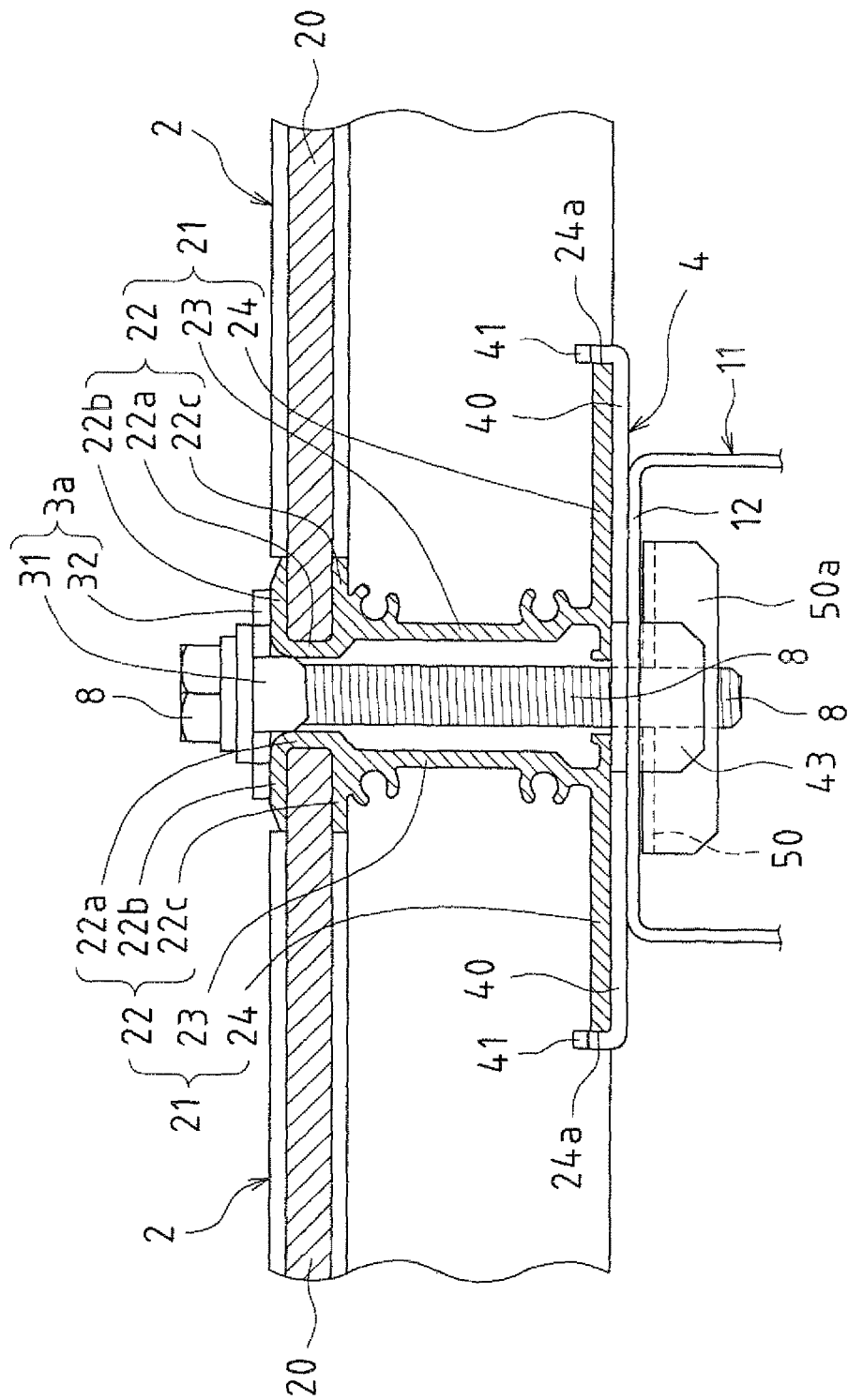
[FIG. 5]

In this state, as shown in FIGS. 4(*a*), 4(*b*) and 5, the upper plate 40 of the lower fixing fitting 4 is sandwiched between the top face 12 of the attachment bar 11 and the bottom portions 24 of the frame members 21 of the two adjacent solar cell modules 2. The inner face of the left side holding piece 41, of the holding pieces 41 formed at the right and left edges of the upper plate 40 of the lower fixing fitting 4, is abutted by the distal end face 24a of the bottom portion 24 of the frame member 21 of the left side solar cell module 2 of the two solar cell modules 2 disposed adjacent and spaced from each other on the top face 12 of the attachment bar 11 of the stand 10. Likewise, the inner face of the right side holding piece 41 is abutted by the distal end face 24a of the bottom portion 24 of the frame member 21 of the right side solar cell module 2 of the adjacent solar cell modules 2.

When installation of the two solar cell modules 2 is completed, the upper fixing fitting 3a is installed next on the edges of the frame members 21 of the two solar cell modules 2. Specifically, in FIGS. 4(*a*) and 5, the pressing plate 31 of the upper fixing fitting 3a is disposed so as to extend in the right-left direction across the gap 7 formed between the frame members 21 provided at the edges of the two adjacent solar cell modules 2.

Then, the protrusion pieces 32 of the upper fixing fitting 3a are inserted from above into the gap 7 formed between the frame members 21 provided at the facing edges of the two adjacent solar cell modules 2. The edges of the two solar cell modules 2 are pressed from above by the pressing plate 31 of the upper fixing fitting 3a and fixed with the bolt 8.

Specifically, as shown in FIGS. 4(*a*), 4(*b*) and 5, the bolt 8 inserted from above into the pressing plate hole 33 formed in the pressing plate 31 of the upper fixing fitting 3a is inserted and fixed into the lower plate connecting hole 51 formed in the lower plate 50 of the lower fixing fitting 4 via the gap 7 formed between the frame members 21 of the two adjacent solar cell modules 2, the upper plate hole 42 formed in the upper plate 40 of the lower fixing fitting 4 and the top face hole 13 formed in the top face 12 of the attachment base 11, whereby the two adjacent solar cell modules 2 are attached to the attachment base 11.

By fastening the upper fixing fitting 3a and the lower fixing fitting 4 with the bolt 8 as described above, the edges of the two solar cell modules 2 sandwiched by the upper fixing fitting 3a and the lower fixing fitting 4 are fixed to the attachment bar 11 of the stand 10 on which the lower fixing fitting 4 is mounted.

The center attachment structure described above employs a configuration in which the pressing plate 31 of the upper fixing fitting 3a presses, from above, the upper holding pieces 22b of the frame members 21 of two adjacent solar cell modules 2.

Accordingly, in a state in which the solar cell modules 2 are attached to the attachment base 11, even if the wind blowing into the backside of the solar cell panels 20 tries to lift the solar cell panels 20 up from below, the pressing plate 31 of the upper fixing fitting 3a can prevent the edges of the solar cell panels 20 from being detached from the holding portions 22 of the frame members 21 holding the solar cell panels 20.

Also, with the solar cell module attachment structure described above, it is possible to attach two adjacent solar cell modules 2 to the attachment base 11 with a simple operation of inserting and fixing a bolt 8 inserted from above in the pressing plate hole 33 formed in the pressing plate 31 of the upper fixing fitting 3a into the lower plate connecting hole 51 formed in the lower plate 50 of the lower fixing fitting 4 via the gap 7 between the frame members 21, the upper plate hole 41 formed in the upper plate 40 of the lower fixing fitting 4, and the top face hole 13 formed in the top face 12 of the attachment base 11. Accordingly, the solar cell modules 2 can be easily attached to the attachment base 11, achieving reduction of the time required for the attachment work.

Figure 18:
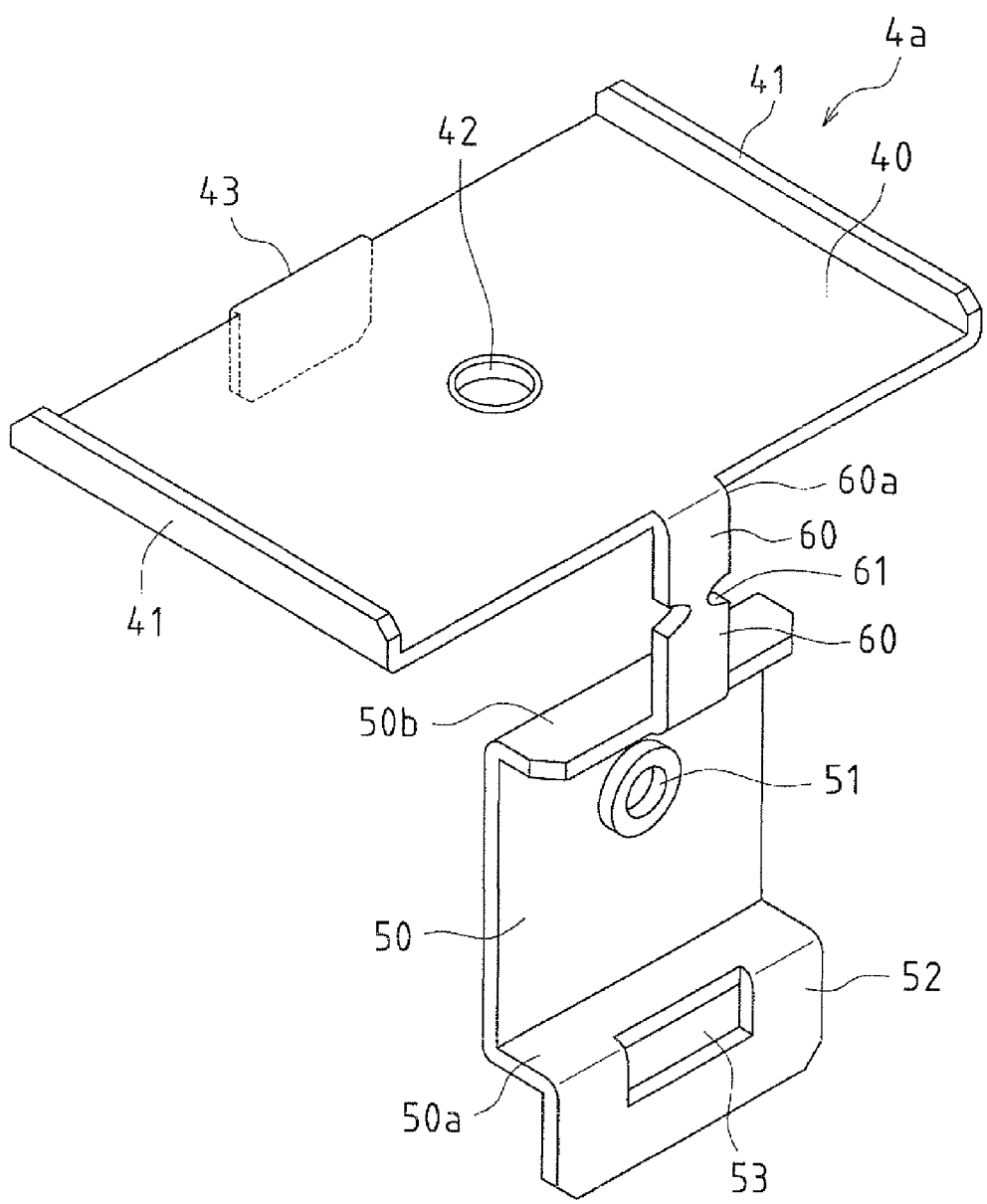
[FIG. 18]

In the solar cell module attachment structure described above, instead of the lower fixing fitting 4, a lower fixing fitting 4a obtained by forming a frontal edge piece 52 having a fitting slit 53 provided therein at the frontal edge of the lower plate 50 of the lower fixing fitting 4 may be used. FIG. 18 is a perspective view showing an exterior of the lower fixing fitting 4a.

The fitting slit 53 formed in the frontal edge piece 52 of the lower fixing fitting 4a is a slit for allowing fitting of the distal end of the positioning piece 43 that is inserted in the positioning slit 14 of the top face 12 of the attachment base 11 and that extends downward from the positioning slit 14.

Figure 19:
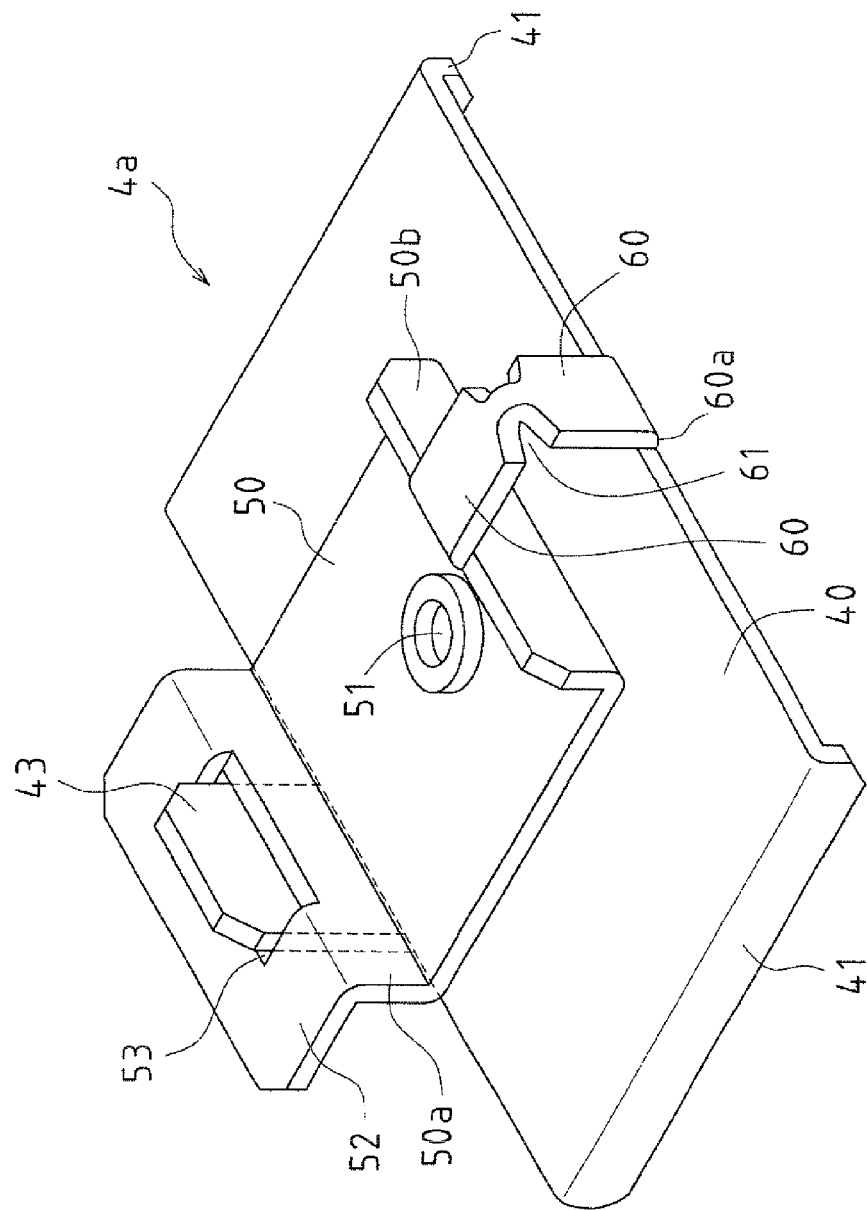
[FIG. 19]

Specifically, in the solar cell module attachment structure using the lower fixing fitting 4a described above, the waist portion 61 of the joint portion 60 of the lower fixing fitting 4a is bent such that the distal end of the positioning piece 43 of the upper plate 40 of the lower fixing fitting 4a extending downward from the positioning slit 14 formed in the top face 12 of the attachment bar 11 of the stand 10 is fitted to the fitting slit 53 formed in the lower plate frontal edge piece 52 of the lower fixing fitting 4a. FIG. 19 is a perspective view showing the lower fixing fitting 4a in the state in which the lower fixing fitting 4a is mounted on the top face 12 of the attachment bar 11 of the stand 10.

With this configuration, the waist portion 61 of the joint portion 60 of the lower fixing fitting 4a can be bent so as to bring the lower plate 50 into close contact with the upper plate 40 such that the lower plate 50 is positioned directly below the upper plate 40 and near the center of the upper plate 40. Accordingly, the top face 12 of the attachment bar 11 of the stand 10 can be sandwiched by the lower plate 50 and the upper plate 40 of the lower fixing fitting 4a with accuracy and ease.

Description of Side Attachment Structure

The side attachment structure will be described next. The side attachment structure is a solar cell module attachment structure used when one of two solar cell modules 2 disposed adjacent in the right-left direction is absent in a state in which the edges of the two solar cell modules 2 disposed adjacent in the right-left direction and spaced from each other can be attached, face-to-face, onto the top face 12 of an attachment bar 11 that is long in the front-rear direction and that is disposed along the edges.

Figure 20:
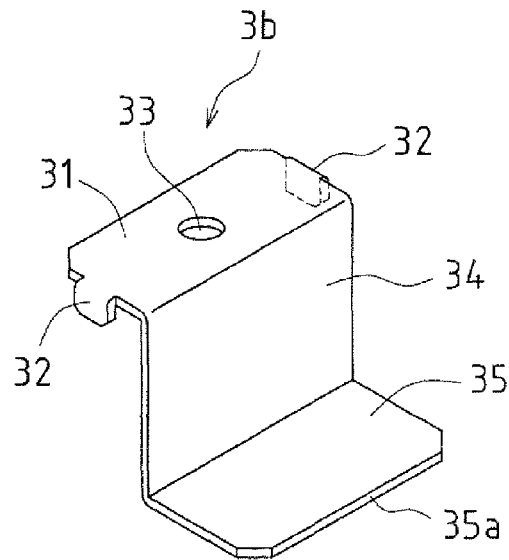
[FIG. 20]
Figure 21:
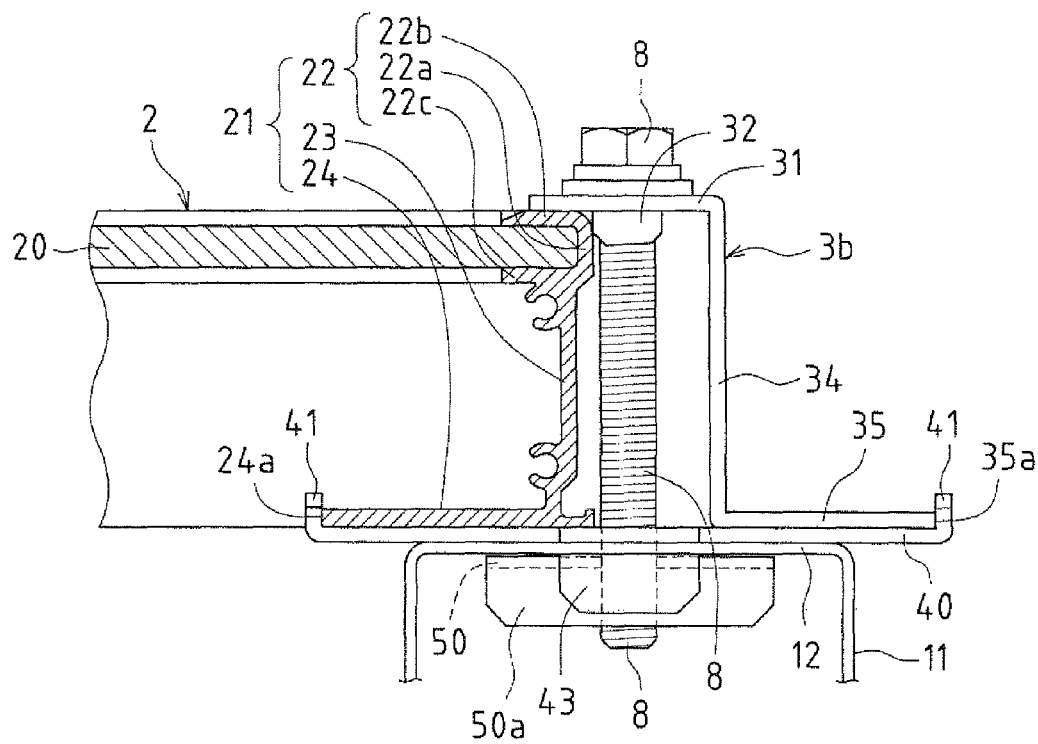
[FIG. 21]

FIG. 20 is a perspective view showing an exterior of an upper fixing fitting 3b used in this side attachment structure. In other words, the side attachment structure uses the upper fixing fitting 3b, instead of the upper fixing fitting 3a and the left side solar cell module 2 in FIG. 5 showing the center attachment structure described above. FIG. 21 is a cross-sectional view showing the side attachment structure.

The side attachment structure uses the upper fixing fitting 3b mentioned above and a lower fixing fitting 4. As the lower fixing fitting 4, the same lower fixing fitting 4 used in the center attachment structure described above can be used.

The upper fixing fitting 3b used in the side attachment structure is constituted by, as shown in FIG. 20, a pressing plate 31 that presses the upper holding piece 22b of the frame member 21 of the edge of the solar cell module 2, protrusion pieces 32 formed by being bent downward at the front and rear edges of the pressing plate 31, an upstanding wall 34 extending downward at one of the right and left edges of the pressing plate 31 in which the solar cell module 2 is not present, and a bottom portion (bottom piece) 35 extending laterally from the lower end of the upstanding wall 34 in a direction opposite to the direction in which the pressing plate 31 is present.

The upper fixing fitting 3b is formed such that either a right or left side face 32a (the right side face in FIG. 21) of the protrusion piece 32 presses the frame member 21 of the solar cell module 2 in a lateral direction.

With the side attachment structure, a solar cell module 2 is attached to an attachment bar 11 in the following manner using the upper fixing fitting 3b and the lower fixing fitting 4. Specifically, the solar cell module 2 is attached to the attachment bar 11 by inserting and fixing a bolt 8 inserted from above into the pressing plate hole 33 formed in the pressing plate 31 of the upper fixing fitting 3b into the lower plate connecting hole 51 formed in the lower plate 50 of the lower fixing fitting 4 via a gap 7 formed between the frame member 21 of the solar cell module 2 and the upstanding wall 34 of the upper fixing fitting 3b, the upper plate hole 42 formed in the upper plate 40 of the lower fixing fitting 4 and the top face hole 13 formed in the top face 12 of the attachment bar 11.

The side attachment structure has substantially the same basic structure as the center attachment structure described above. Accordingly, the side attachment structure also has the same actions and effects as those of the center attachment structure described above.

Figure 22:
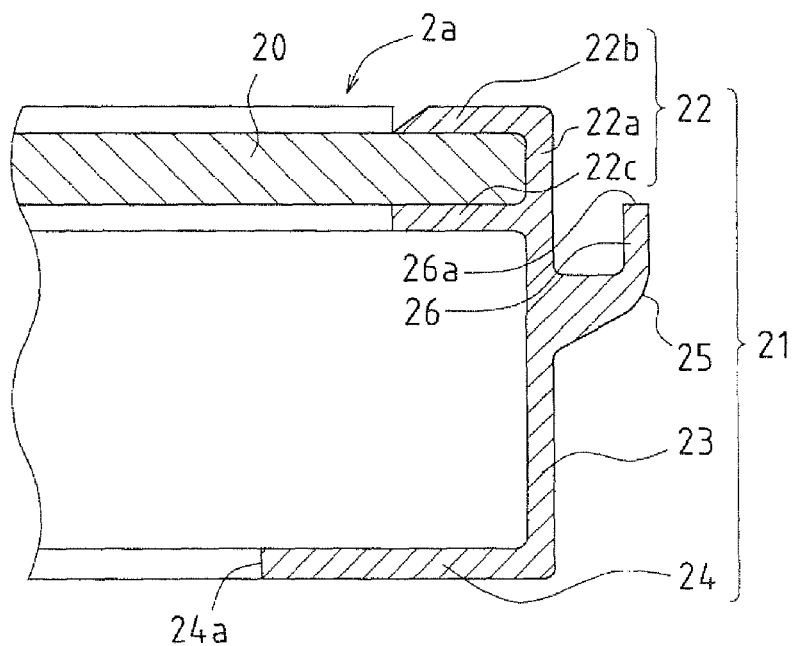
[FIG. 22]

Description of Solar Cell Module Attachment Structure in the Case where Frame Member Provided with Hook Piece is Used In the above description, solar cell modules 2 configured as shown in FIG. 3 are used in the solar cell apparatus 1. However, it is also possible to obtain a solar cell apparatus as described above by using solar cell modules 2a using a frame member 21 provided with a hook piece 25 protruding outward from the wall portion 23 of the frame member, with the distal end thereof being bent upward and forming a protruding wall 26 as shown in FIG. 22, as a frame member for a solar cell module. A solar cell module center attachment structure in this case will be described next.

In the solar cell module center attachment structure in the case where a frame member provided with a hook piece 25 is used, as described above, the wall portion 23 of the frame member 21a of a solar cell module 2a is provided with a hook piece 25 protruding outward from the wall portion 23, with the distal end thereof being bent upward and forming a protruding wall 26.

Figure 23:
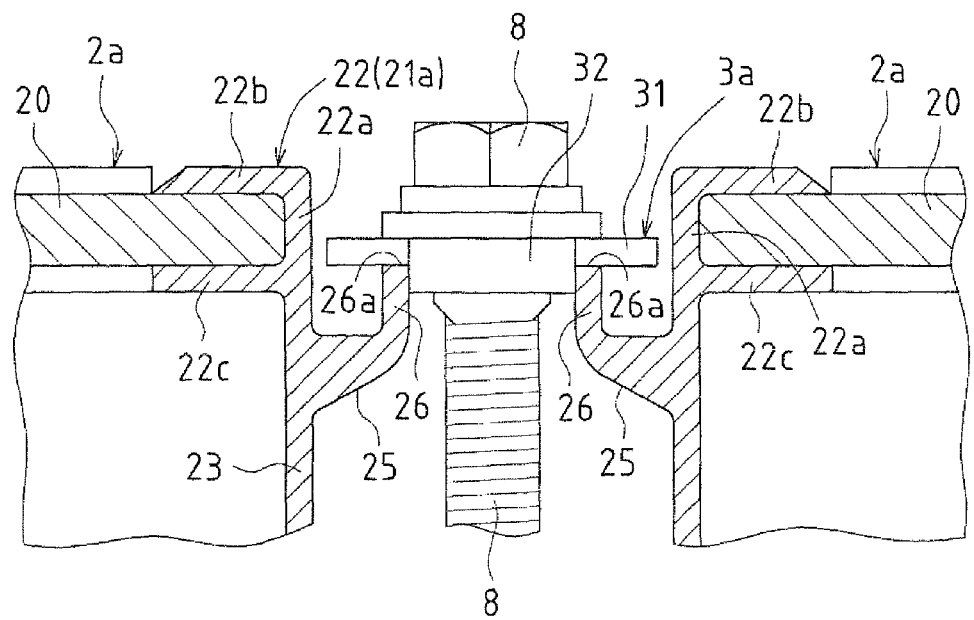
[FIG. 23]

As shown in FIG. 23, the pressing plate 31 of the upper fixing fitting 3a is disposed so as to extend in the right-left direction across a gap 7 formed between the protruding walls 26 of the hook pieces 25 of two solar cell modules 2a, rather than extending in the right-left direction across the gap 7 formed between the holding walls 22a of the frame members 21 provided at the facing edges of two adjacent solar cell modules 2 in the center attachment structure described above.

Also, the pressing plate 31 of the upper fixing fitting 3a presses, from above, the upper end faces of the protruding walls 26 of the hook pieces 25 of the solar cell modules 2a, rather than pressing from above the upper holding pieces 22b of the frame members 21a of the two adjacent solar cell modules 2a in the center attachment structure.

Then, the protrusion pieces 32 of the upper fixing fitting 3a are inserted into the gap 7 formed between the protruding walls 26 of the hook pieces 25 of the solar cell module 2a, rather than being inserted in the gap 7 formed between the holding walls 22a of the frame members 21a provided at the facing edges of two adjacent solar cell modules 2a in the center attachment structure described above.

The solar cell module attachment structure in the case where a frame member provided with a hook piece is used has substantially the same structure as the center attachment structure described above. Accordingly, the solar cell module center attachment structure in the case where a frame member provided with a hook piece is used also has the same actions and effects as the center attachment structure described above.

The solar cell module center attachment structure in the case where a frame member provided with a hook piece is used has been described above, but a solar cell module side attachment structure in the case where a frame member provided with a hook piece can be achieved in the same manner as the side attachment structure described above.

Figure 24:
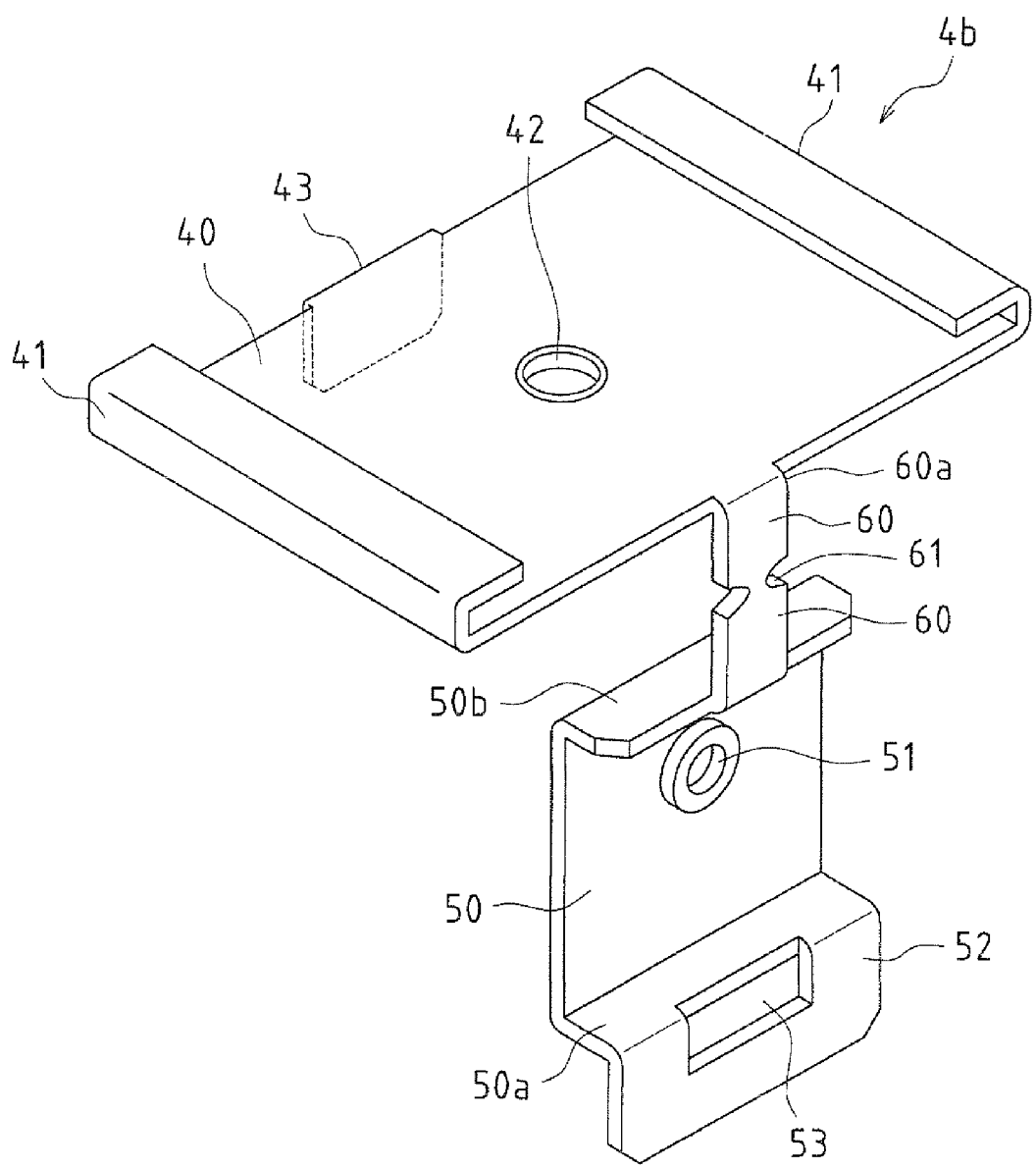
[FIG. 24]

Description of Solar Cell Module Attachment Structure in the Case where Lower Fixing Fitting Having Bent U-Shaped Holding Pieces is Used In the above description, the lower fixing fitting 4 configured as shown in FIG. 8 or FIG. 18 is used in the solar cell apparatus 1. However, it is also possible to obtain a solar cell apparatus as described above by using a lower fixing fitting having bent U-shaped holding pieces 41, which is shown as a lower fixing fitting 4b in FIG. 24.

Figure 25:
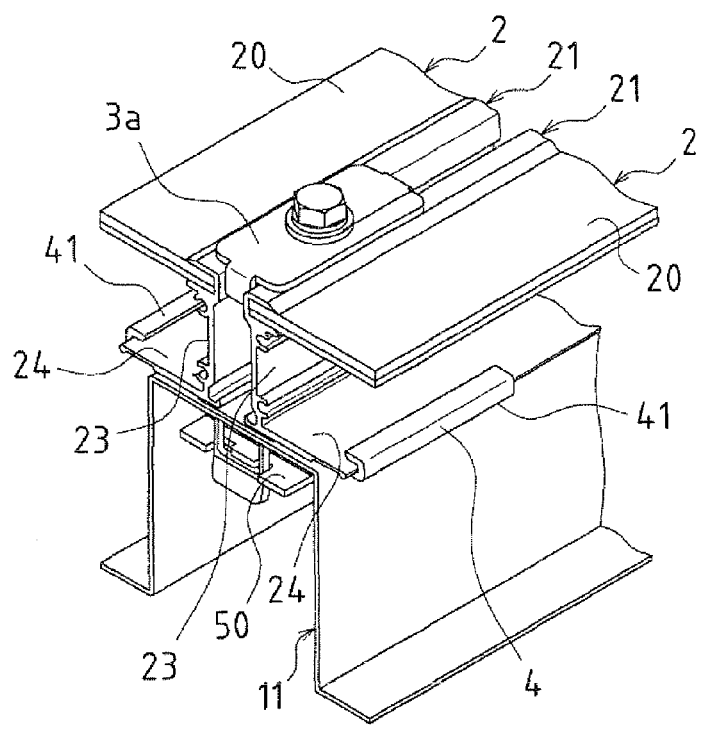
[FIG. 25]
Figure 25:
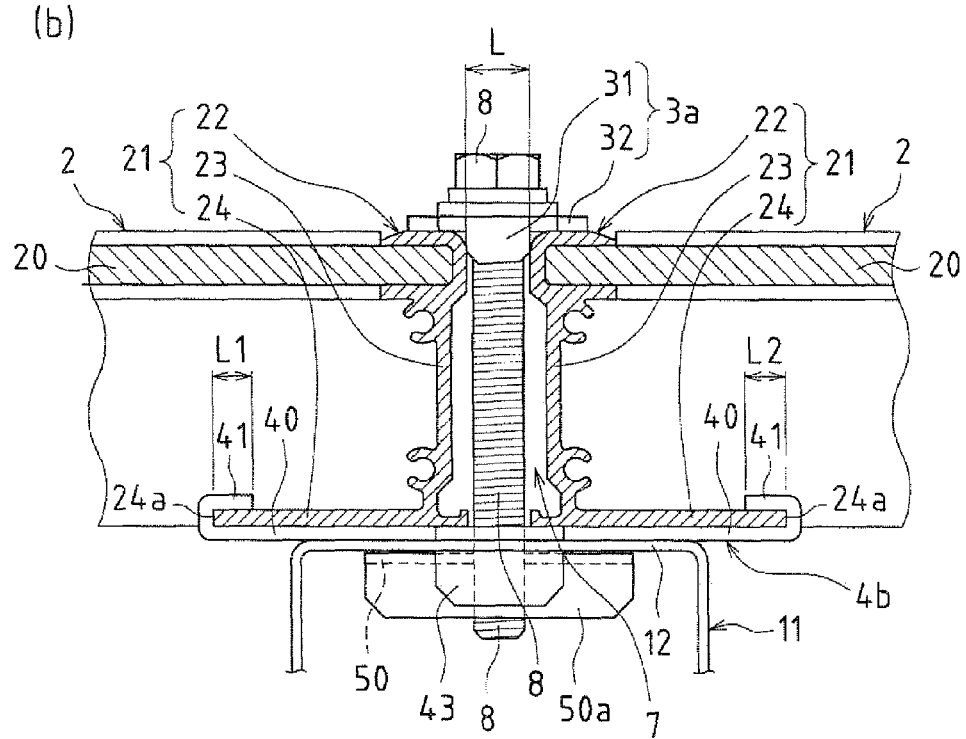

In a solar cell module center attachment structure in the case where a lower fixing fitting 4b having bent U-shaped holding pieces 41 is used, as shown in the perspective view of FIG. 25(a) and the partial cross-sectional view of FIG. 25(b), each U-shaped holding piece 41 surrounds and fits a part of the distal end face 24a of the bottom portion 24.

Specifically, by inserting the distal end face 24a of the bottom portion 24 into the U-shaped holding piece 41, the bottom portion 24 itself can be fixed against vertical displacement, obtaining a structure more resistant to wind loads and the like.

When the lower fixing fitting 4b is configured such that the distance between the frame members 21 indicated by L in FIG. 25(b) and the lengths of the folded edges of the holding pieces 41 indicated by L1 and L2 in the same diagram satisfy the relationship: $L \geq L1+L2$, the frame members 21 can be more easily attached to the lower fixing fitting 4b.

The solar cell module attachment structure in the case where a lower fixing fitting having bent U-shaped holding pieces is used has substantially the same basic structure as the center attachment structure described above. Accordingly, the solar cell module attachment structure in the case where a lower fixing fitting having bent U-shaped holding pieces is used also has the same actions and effects as the center attachment structure described above.

Description of Solar Cell Module Attachment Structure in the Case Where Lower Fixing Fitting Having L-Shaped Holding Pieces is Used In the above description, as the frame member 21 in the solar cell apparatus 1, the frame member constituted by a holding portion 22, a wall portion 23 provided continuously and upright below the holding portion 22 and a bottom portion (bottom piece) 24 extending from the lower end of the wall portion 23 in the same direction as an upper holding piece 22b and a lower holding piece 22c is used. In other words, the bottom portion 24 is a bottom piece provided with a horizontally extending fin.

Figure 26:
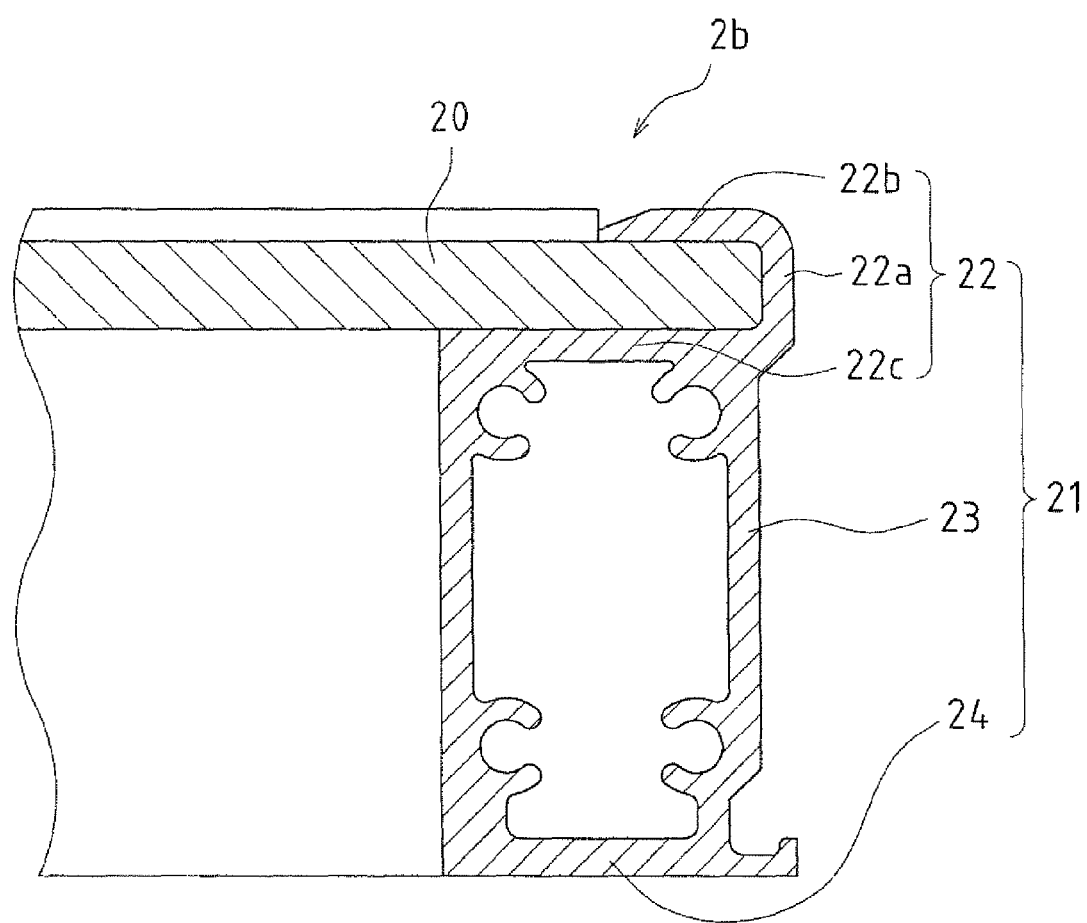
[FIG. 26]

However, as shown in the cross-sectional view of FIG. 26, it is also possible to obtain a solar cell apparatus 1 as described above by using a solar cell module 2b in which the bottom portion 24 is not provided with such a fin.

Figure 27:
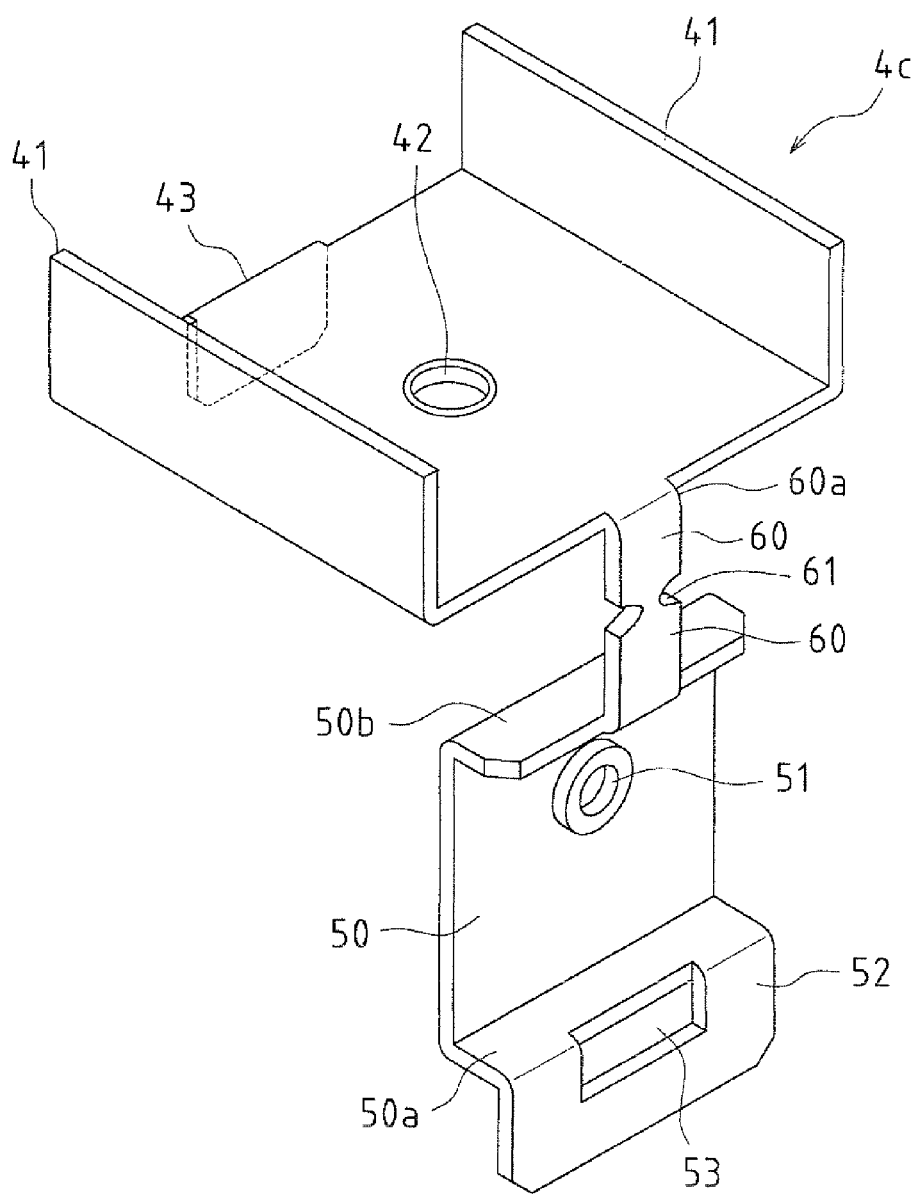
[FIG. 27]

In a solar cell module center attachment structure in the case where the bottom portion 24 is provided with no fin, a lower fixing fitting 4c having upstanding L-shaped holding pieces 41 formed by bending the right and left edges of the upper plate 40 of the lower fixing fitting 4 as shown in FIG. 27 is used.

Figure 28:
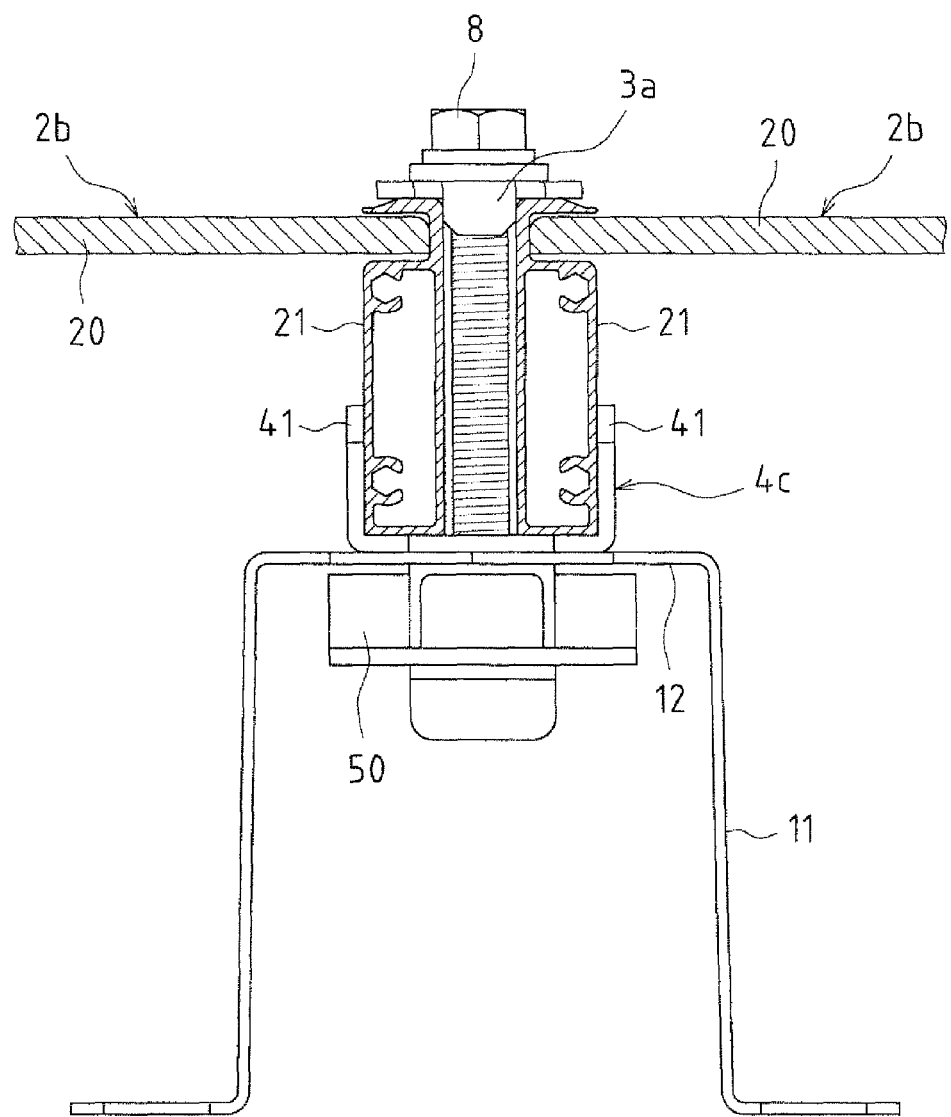
[FIG. 28]

Specifically, a solar cell module 2 is positioned by, as shown in the cross-sectional view of FIG. 28, causing the upstanding holding piece 41 of the lower fixing fitting 4c to abut the side face of the bottom portion 24.

Thereby, even when a structure in which the bottom portion 24 is provided with no fin portion is used (for example, a hollow structure without a fin) as a frame member of a solar cell module, a solar cell apparatus as described above can be obtained.

The solar cell module attachment structure in the case where a lower fixing fitting having L-shaped holding pieces is used has substantially the same structure as the center attachment structure described above. Accordingly, the solar cell module attachment structure in the case where a lower fixing fitting having L-shaped holding pieces is used also has the same actions and effects as the center attachment structure described above.

Figure 29:
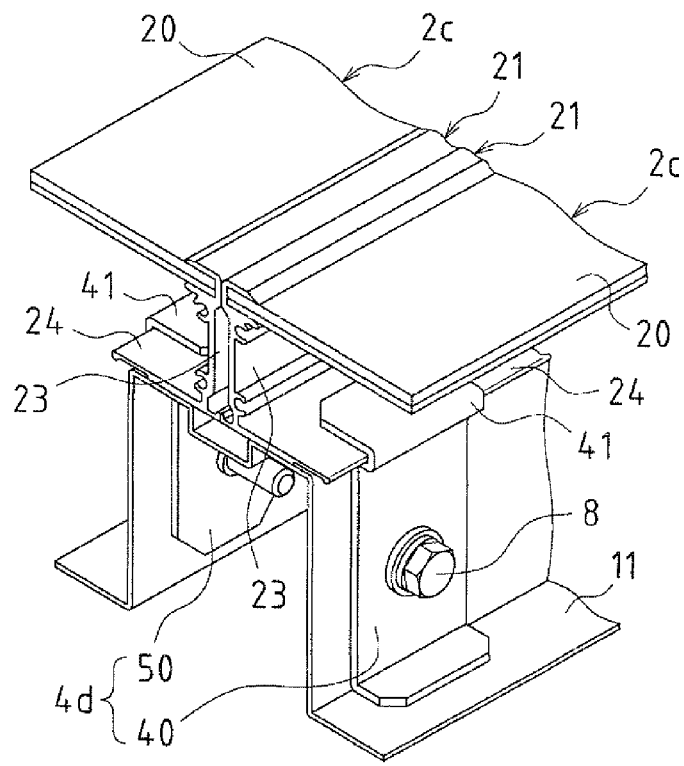
[FIG. 29]
Figure 29:
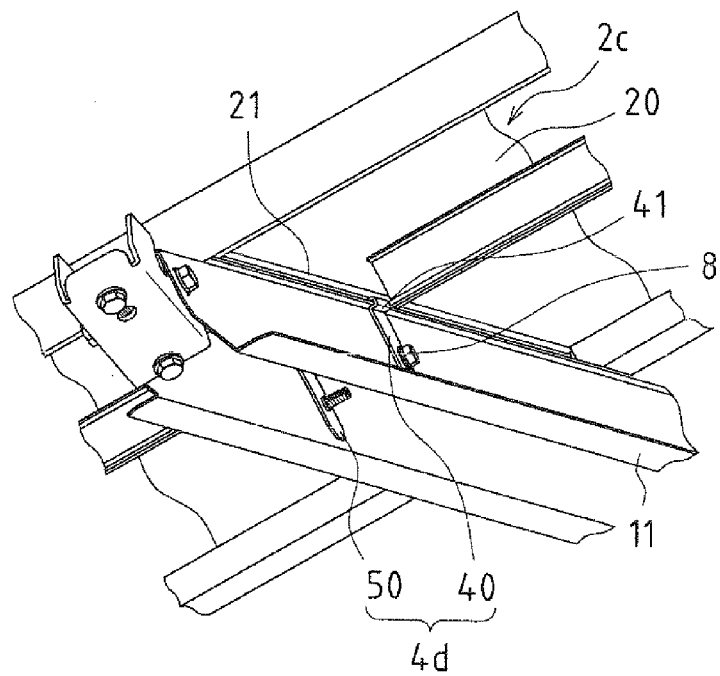
Figure 30:
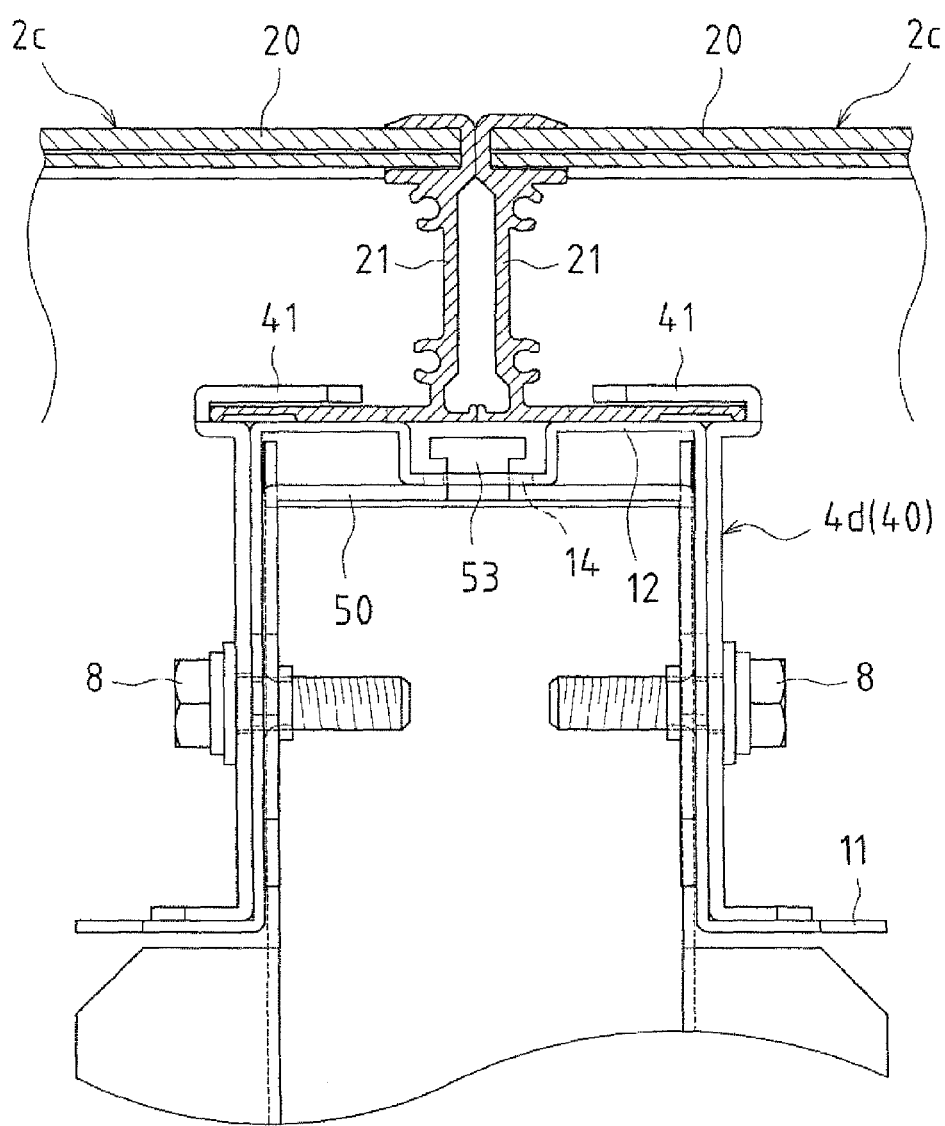
[FIG. 30]

Description of Solar Cell Module Attachment Structure in the Case of Using Only Lower Fixing Fitting A solar cell module attachment structure in the case of using only a lower fixing fitting will be described next. FIG. 29(a) is a perspective view showing a state in which the edges of two solar cell modules 2c are mounted and attached, in the right-left direction, to the attachment bar 11 of the centrally disposed stand 10 in the solar cell apparatus 1, as viewed from the solar cell module 2 side. FIG. 29(b) is a perspective view of the same as viewed from the underside of the top face 12 of the attachment bar 11 of the stand 10. FIG. 30 is a partial cross-sectional view of the same.

This center attachment structure is a solar cell module attachment structure with which the edges of two solar cell modules 2c disposed adjacent in the right-left direction (with almost no gap) are attached, face-to-face, onto the top face 12 of an attachment bar 11 that is long, for example, in the front-rear direction and that is disposed along the edges.

In this attachment structure, only a lower fixing fitting 4d is used. Hereinafter, the lower fixing fitting 4d will be described.

Figure 31:
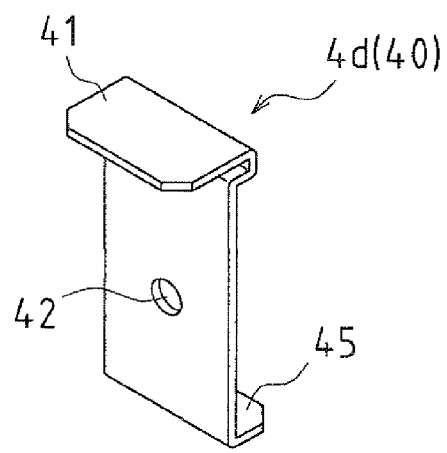
[FIG. 31]
Figure 31:
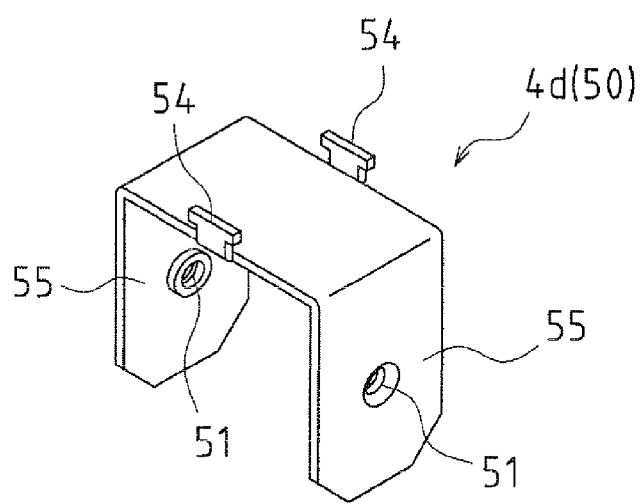

FIG. 31(a) is a perspective view showing an exterior of an upper plate 40 of the lower fixing fitting 4d, and FIG. 31(b) is a perspective view showing an exterior of a lower plate 50 of the lower fixing fitting 4d. The lower fixing fitting 4d is used by being mounted to the top face 12 of the attachment bar 11 of the stand 10 when the solar cell module 2c is attached to the attachment bar 11 of the stand 10.

The upper plate 40 includes a fin piece 45 that is bent vertically at the lower end of the upper plate 40 and a holding piece 41 that is bent in the same direction as the fin piece 45 at the upper end of the upper plate 40 and folded back to form a U shape. Such an upper plate 40 having the same shape is used pairwise.

On the other hand, the lower plate 50 includes two edge pieces 55 that are bent vertically downward and has a quadrangular shape having one side open as viewed in cross section. Upwardly bent positioning pieces 54 are provided at the side edges of the top face.

Furthermore, an upper plate hole 42 is formed at the center of the upper plate 40 of the lower fixing fitting 4d. On the other hand, lower plate connecting holes 51 are formed in the bent edge pieces 55 of the lower plate 50 of the lower fixing fitting 4d. The upper plate hole 42 in the upper plate 40 of the lower fixing fitting 4d is a hole for insertion of a bolt 8, and each lower plate connecting hole 51 of the lower plate 50 of the lower fixing fitting 4d is, for example, a screw hole for insertion of a bolt 8 as a connecting member.

An attachment structure assembling method in the attachment bar 11 of the stand 10 disposed at the center of the solar cell apparatus 1 employing the center attachment structure will be described. As the assembling method in the center attachment structure, firstly, two solar cell modules 2c are installed on the top face 12 of the attachment bar 11 of the stand 10 such that the edges of the frame members 21 are adjacent.

Next, positioning of the lower plate 50 in the front reardirection is performed by inserting the lower plate 50 of the lower fixing fitting 4d into the attachment bar 11 (the inside of the top face 12), and inserting the positioning pieces 53 into the positioning slits 14 formed in the top face 12. A recess is provided in the attachment bar 11 along the length direction thereof, so that the positioning pieces 53 do not come into contact with the bottoms of the solar cell modules 2c.

Then, two upper plates 40 of the lower fixing fitting 4d are brought into close contact with both side faces of the attachment bar 11 such that each U-shaped holding piece 41 surrounds and fits the distal end 24a of the bottom portion of the frame member 21.

Finally, a bolt 8 is inserted into the pressing plate hole 33 of each upper plate 40 of the lower fixing fitting 4d, and inserted and fixed into the lower plate connecting hole 51 formed in the lower plate 50 of the lower fixing fitting 4 via the hole 13 formed in the side face of the attachment bar 11, whereby the two adjacent solar cell modules 2c are attached to the attachment base 11.

In this attachment structure, the lower fixing fitting fixes the bottom portions of the frame members on the top face of the attachment base, and positions the edges of the two solar cell modules relative to each other, and thus the resistance to up-blowing wind load can be enhanced. It is also possible to omit the upper fixing fitting, thereby achieving simplified attachment work and cost reduction. Furthermore, the attachment work can be performed from the underside and lateral sides of the attachment bar, and thus the efficiency of attachment work can be increased. There is also another advantage that the attachment work can be carried out easily even at a fixing position where the rear ends of the modules are higher.

Particularly, because there is no gap between the adjacent solar cell modules, and thus other advantages can be obtained such as a good exterior appearance and reduced array size.

The solar cell module attachment structure that uses only the lower fixing fitting has substantially the same structure as the center attachment structure described above. Accordingly, the solar cell module attachment structure that uses only the lower fixing fitting also has the same actions and effects as the center attachment structure described above.

In the solar cell apparatus 1 employing the solar cell module attachment structure according to the embodiment described above, as shown in FIG. 1, four solar cell modules 2 are attached using three stands 10 that are disposed parallel to each other at positions corresponding to the left edge, the right edge and the center of the solar cell apparatus 1.

However, the configuration of the solar cell apparatus 1 employing the solar cell module attachment structure according to the present embodiment is not limited thereto, and the number of attachable solar cell modules 2 can be increased, for example, in FIG. 1, by increasing the number of stands 10 disposed parallel to each other or by using stands 10 having longer attachment bars 11.

The modes for carrying out the invention have been described above by way of examples, but the stand 10 may have an attachment bar 11 that is disposed directly on an inclined roof instead of the attachment bar 11 disposed at an incline, and the attachment bar 11 may be installed in the horizontal plane such as a flat roof without an incline. Also, the lengthwise direction of the attachment bar 11 may not necessarily be the direction of inclination, and the attachment bar 11 may be installed, for example, perpendicular to the inclination direction of the inclined roof.

Figure 34:
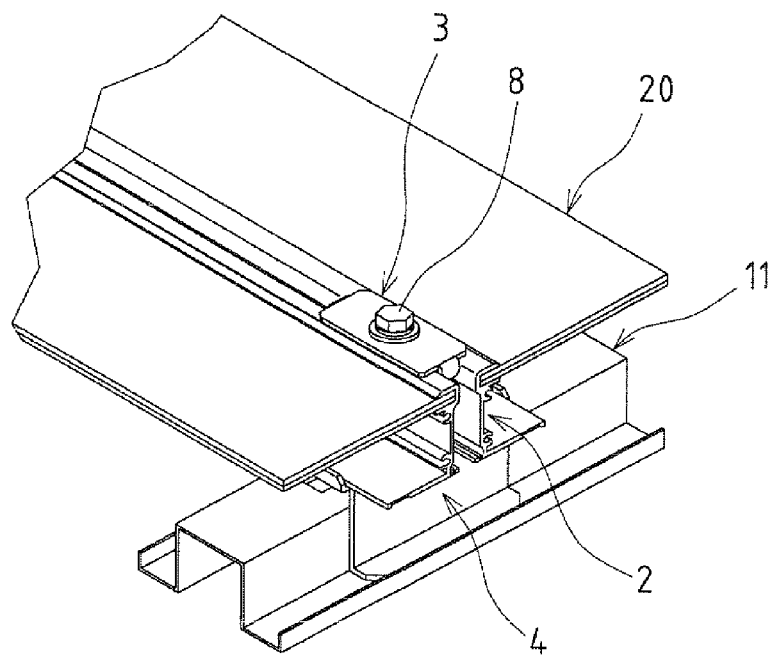
[FIG. 34]
Figure 35:
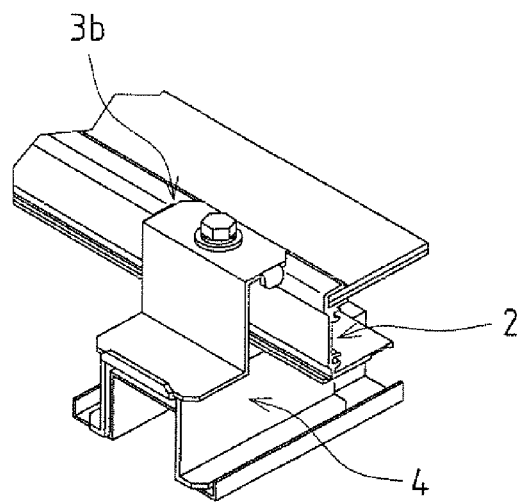
[FIG. 35]

Also, the examples in which the holding pieces 41 formed at both edges of the upper plate 40 of the lower fixing fitting 4 are formed along the lengthwise direction of the attachment bar 11 have been described, but the holding pieces 41 may be formed along a direction that intersects the lengthwise direction of the attachment bar 11. In other words, in this case, as shown in FIG. 34 (FIG. 35 in the case of the side attachment structure), the lower fixing fitting 4 may be disposed such that the gap 7 formed between the frame members 21 of adjacent solar cell modules and the attachment bar 11 intersect with each other.

Figure 32:
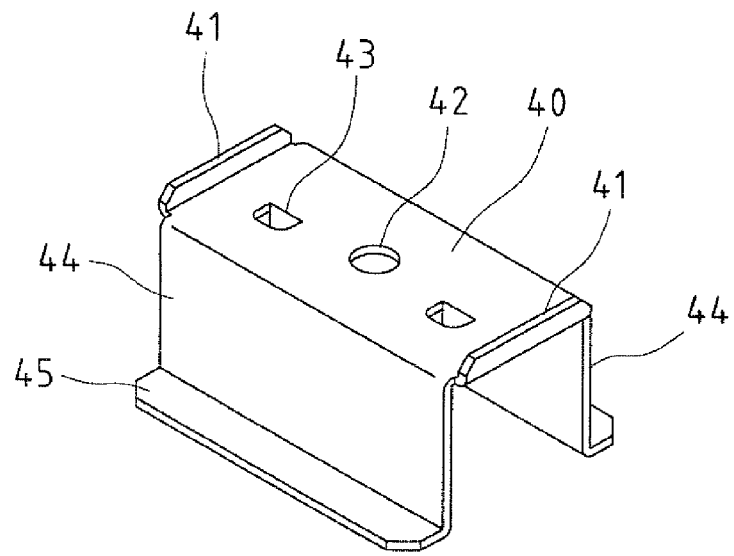
[FIG. 32]

In one of the examples described above, the attachment bar 11 and the lower fixing fitting 4 are attached such that the top face 12 of the attachment bar 11 and the lower face of the upper plate 40 of the lower fixing fitting 4 come into contact with each other, but as shown in FIG. 32, the lower fixing fitting 4 may be configured to have side plate portions 44 extending downward from the upper plate 40 of the lower fixing fitting 4 so that the side plate portions 44 can surround the attachment bar 11, and the lower fixing fitting 4 may be fitted and fixed to the attachment bar 11.

In this case, the lower fixing fitting 4 is fitted and fixed such that the outer side of side face portions 17 extending downward from the top face 12 of the attachment bar 11 and the inner side of the side plate portions 44 extending downward from the upper plate 40 come into contact with each other. Also, in this case, it is preferable to provide a bent fin piece 45 at the distal end of each side plate portion 44 for reinforcement against torsion.

Also, the examples in which the upper plate 40 and the lower plate 50 of the lower fixing fitting (4) are integrated have been described, but the upper plate 40 and the lower plate 50 may be implemented as separate parts. Also, the examples in which the positioning piece 43 is provided in the upper plate 40 have been described, but the positioning piece for positioning of the attachment bar 11 in the lengthwise direction may be provided in the lower plate 50.

Figure 33:
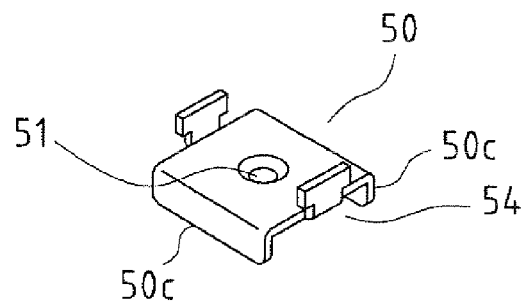
[FIG. 33]

Also, in the case where the attachment bar 11 is fitted to the side plate portions 44 of the lower fixing fitting 4 and the direction that intersects the lengthwise direction of the attachment bar 11 is fixed as shown in FIG. 34, it is effective to provide protrusion pieces 54 in the lower plate 50 as shown in FIG. 33 and insert them into attachment aid holes 15 formed in the vertical bar, because positioning of the lower plate 50 in the lengthwise direction can be carried out easily.

Furthermore, it is also effective to cause flange-like positioning pieces 43 protruding downward from the upper plate 40 to abut the protrusion pieces 54 of the lower plate 50 because the upper plate 40 is thereby locked by the protrusion pieces 54 of the lower plate 50, and positioning of the upper plate 40 can be carried out easily.

In the case of providing the protrusion pieces 54 in the plate 50, it is preferable that the height of protrusion of the protrusion pieces 54 from the attachment bar 11 is equal to the height of protrusion of the positioning pieces 43, protruding downward from the upper plate 40, from the lower face of the upper plate 40, whereby a predetermined space can be maintained easily between the top face 12 of the attachment bar 11 and the upper plate 40 of the lower fixing fitting 4.

Alternatively, it is also possible to employ a configuration in which fin pieces 18 corresponding to the fin pieces 45 are provided in the attachment bar 11, and the fin pieces 45 at the distal ends of the side plate portions 44 are caused to abut the fin pieces 18. In this case, by making the height of the side plate portions 44 greater than that of the side face portions 17, positioning in the height direction can be carried out easily.

It is also possible to form an upwardly bent fin piece 19 at the distal end of each fin piece 18 such that the fin piece 18 and the fin piece 19 together form an L shape. In this case, by forming such an L shape, the overall strength of the attachment bar 11 can be increased, and the fin pieces 19 prevent the side plate portions 44 from opening in such a direction that a gap is created between the side plate portion 44 and the side face portion 17 of the attachment bar 11, whereby the integration of the attachment bar 11 and the upper plate 40 can be increased, and solar cell modules 2 can be reliably attached.

Similarly, as shown in FIG. 33, lower plate side walls 50c may be formed in the lower plate 50, and the outer side faces of the lower plate side walls 50c may be caused to abut the inner faces of the side face portions 17 of the attachment bar 11. In this case, the integration of the attachment bar 11 and the lower plate 50 can be increased, and solar cell modules 2 can be reliably attached.

It is also possible to employ a configuration in which the outer side faces of the lower plate side walls 50c are caused to abut the inner faces of the side face portions 17 of the attachment bar 11, and the inner faces of the side plate portions 44 are caused to abut the outer faces of the side face portions 17, whereby the integration between the attachment bar 11 and the lower fixing fitting 4 constituted by the upper plate 40 and the lower plate 50 can be increased, and solar cell modules 2 can be reliably attached.

DESCRIPTION OF REFERENCE NUMERALS

1 Solar Cell Apparatus
2 Solar Cell Module
2a Solar Cell Module
2b Solar Cell Module
2c Solar Cell Module
3a Upper Fixing Fitting
3b Upper Fixing Fitting
4 Lower Fixing Fitting
4a Lower Fixing Fitting
4b Lower Fixing Fitting
4c Lower Fixing Fitting
4d Lower Fixing Fitting
7 Gap
8 Connecting Member
10 Stand
11 Attachment Bar
12 Top Face
13 Top Face Hole
14 Positioning Slit
15 Attachment Aid Hole
16 Vertical Bar
20 Solar Cell Panel
21 Frame Member
21a Frame Member
22 Holding Portion
22a Holding Wall
22b Upper Holding Piece
22c Lower Holding Piece
23 Wall Portion
24 Bottom Portion
24a Distal End Face of Bottom Portion
24 Bottom Portion
24a Distal End Face of Bottom Portion
25 Hook Piece
26 Protruding Wall
26a Upper End Face of Protruding Wall
31 Pressing Plate
32 Protrusion Piece
33 Pressing Plate Hole
34 Upstanding Wall
35 Bottom Portion
35a Distal End Face of Bottom Portion
40 Upper Plate
41 Holding Piece
42 Upper Plate Hole
43 Positioning Piece
44 Side Plate Portion
45 Fin Piece
50 Lower Plate
50a Lower Plate Frontal Wall
50b Lower Plate Rear Wall
50c Lower Plate Side Wall
51 Lower Plate Connecting Hole
52 Frontal Edge Piece
53 Fitting Slit
54 Protrusion Piece
55 Edge Piece
60 Joint Portion
60a Connecting Portion
61 Waist Portion

The invention claimed is:

1. A solar cell module attachment structure for attaching, face-to-face, edges of two adjacently disposed solar cell modules onto a top face of an attachment base disposed along the edges,
wherein each edge of the solar cell modules is provided with a frame member including: a holding portion holding a solar cell panel; a wall portion provided continuously with the holding portion; mid a bottom portion that is provided continuously with the wall portion on a side opposite to the holding portion and that is attached onto the top face, and
the solar cell module attachment structure is provided with a lower fixing fitting for fixing the bottom portion of the frame member on the top face of the attachment base and positioning the edges of the two solar cell modules relative to each other,
wherein the lower fixing fitting comprises a monolithic plate including an upper plate, a lower plate, a joint portion for joining the upper plate and the lower plate, and a lower plate rear wall bent vertically at a rear edge of the lower plate formed between the lower plate and the joint portion,
wherein the joint portion includes, in a middle thereof, a bendable waist portion and the joint portion includes a wider portion than the bendable waist portion,
wherein the lower fixing fitting bends at the joint portion and sandwiches the top face between the upper plate and the lower plate; and
a connecting member to connect the upper plate and the lower plate for sandwiching the top face.

2. A solar cell module attachment structure for attaching, face-to-face, edges of two solar cell modules that are disposed adjacent and spaced from each other onto a top face of an attachment base disposed along the edges,
wherein each edge of the solar cell modules is provided with a frame member including: a holding portion holding a solar cell panel; a wall portion provided continuously with the holding portion; and a bottom portion that is provided continuously with the wall portion on a side opposite to the holding portion and that is attached onto the top face,
with the use of an upper fixing fitting that is disposed so as to extend across a gap formed between the flame members of the two adjacent solar cell modules in a direction in which the solar cell modules are adjacent and that presses from above the holding portions of the frame members of the two adjacent solar cell modules, and
a lower fixing fitting that vertically sandwiches the top face of the attachment base, the lower fixing fitting comprising a monolithic plate including an upper plate, a lower plate, a joint portion for joining the upper plate and the lower plate, and a lower plate rear wall bent vertically at a rear edge of the lower plate formed between the lower plate and the joint portion, wherein the joint portion includes, in a middle thereof, a bendable waist portion and the joint portion includes a wider portion than the bendable waist portion, wherein the lower fixing fitting bends at the joint portion and sandwiches the top face between the upper plate and the lower plate, and the two adjacent solar cell modules are attached to the attachment base by inserting a connecting member inserted into the upper fixing fitting from above into the lower fixing fitting via the gap formed between the frame members of the two adjacent solar cell modules, the lower fixing fitting and the top face of the attachment base.

3. A solar cell module attachment structure for attaching, face-to-face, edges of two solar cell modules that are disposed adjacent and spaced from each other onto a top face of an attachment base disposed along the edges, wherein each edge of the solar cell modules is provided with a frame member including: a holding portion that is formed of an upstanding holding wall, and an upper holding piece and a lower holding piece respectively extending from an upper end and a lower end of the holding wall in the same lateral direction, and that has a quadrangular cross section having one side open so that an edge of a solar cell panel is sandwiched inside the quadrangular shape having one side open; an upright wall portion provided continuously below the holding portion; and a bottom portion extending from a lower end of the wall portion in the same direction as the upper holding piece and the lower holding piece, with the use of an upper fixing fitting including: a pressing plate that is disposed so as to extend across a gap formed between the frame members provided at the facing edges of the two adjacent solar cell modules in a direction in which the solar cell modules are adjacent and that presses from above the upper holding pieces of the frame members of the two adjacent solar cell modules; and protrusion pieces that are formed at both front and rear edges of the pressing plate so as to protrude downward and that are inserted into the gap from above, and a lower fixing fitting including an upper plate and a lower plate that vertically sandwich the top face of the attachment base, the upper plate being sandwiched between the top face of the attachment base and the bottom portions of the frame members of the two adjacent solar cell modules, the upper plate including holding pieces formed by bending both edges thereof upward, an inner face of one of the holding pieces being abutted by a part of the bottom portion of the frame member of one of the adjacent solar cell modules, and an inner face of the other holding piece being abutted by a part of the bottom portion of the frame member of the other of the adjacent solar cell modules, the lower fixing fitting comprising a monolithic plate including the upper plate, the lower plate a joint portion for joining the upper plate and the lower plate, and a lower plate rear wall bent vertically at a rear edge of the lower plate formed between the lower plate and the joint portion, wherein the joint portion includes, in a middle thereof, a bendable waist portion and the joint portion includes a wider portion than the bendable waist portion, wherein the lower fixing fitting bends at the joint portion to sandwich the top face between the upper plate and the lower plate, the two adjacent solar cell modules are attached to the attachment base by inserting a connecting member inserted from above into a pressing plate hole formed in the pressing plate of the upper fixing fitting into a lower plate connecting hole formed in the lower plate of the lower fixing fitting via the gap formed between the frame members of the two adjacent solar cell modules, an upper plate hole formed in the upper plate of the lower fixing fitting and a top face hole formed in the top face of the attachment base.

4. The solar cell module attachment structure according to claim 3, wherein the top face hole formed in the top face of the attachment base is a long hole that is long in a direction in which the solar cell modules are adjacent.

5. The solar cell module attachment structure according to claim 3, wherein a positioning slit for the lower fixing fitting is formed in front of the top face hole in the top face of the attachment base, and a downwardly bent positioning piece is formed at a frontal edge of the upper plate of the lower fixing fitting, and positioning in a lengthwise direction of the top face of the attachment base of the lower fixing fitting is performed by inserting from above the positioning piece into the positioning slit in the top face of the attachment base.

6. A solar cell module attachment structure for attaching, face-to-face, edges of two solar cell modules that are disposed adjacent in a right-left direction and spaced from each other onto a top face of an attachment base disposed along the edges in a front-rear direction, wherein each edge of the solar cell modules is provided with a frame member including: a holding portion that is formed of an upstanding holding wall, and an upper holding piece and a lower holding piece respectively extending from an upper end and a lower end of the holding wall in the same lateral direction, and that has a quadrangular cross section having one side open so that an edge of a solar cell panel is sandwiched inside the quadrangular shape having one side open; an upright wall portion provided continuously below the holding portion; and a bottom portion extending from a lower end of the wail portion in the same direction as the upper holding piece and the lower holding piece, with the use of an upper fixing fitting including: a pressing plate that is disposed so as to extend in the right-left direction across a gap formed between the frame members provided at the facing edges of the two adjacent solar cell modules and that presses from above the upper holding pieces of the frame members of the two adjacent solar cell modules; and protrusion pieces that are formed at both front and rear edges of the pressing plate so as to protrude downward and that are inserted into the gap from above, and a lower fixing fitting including an upper plate and a lower plate that vertically sandwich the top face of the attachment base, the upper plate being sandwiched between the top face of the attachment base and the bottom portions of the frame members of the two adjacent solar cell modules, the upper plate including holding pieces formed by bending both right and left edges thereof upward, an inner face of the left-side holding piece being abutted by a distal end face of the bottom portion of the frame member of the left-side solar cell module of the adjacent solar cell modules, and an inner face of the right-side holding piece being abutted by a distal end face of the bottom portion of the frame member of the right-side solar cell module of the adjacent solar cell modules, the lower fixing fitting comprising a monolithic plate including the upper plate, the lower plate, a joint portion for joining the upper plate and the lower plate, and a lower plate rear wall bent vertically at a rear edge of the lower plate formed between the lower plate and the joint portion, wherein the joint portion includes, in a middle thereof, a bendable waist portion and the joint portion includes a wider portion than the bendable waist portion, wherein the lower fixing fitting bends at the joint portion to sandwich the top face between the upper plate and the lower plate, the two adjacent solar cell modules are attached to the attachment base by inserting a connecting member inserted from above into a pressing plate hole formed in the pressing plate of the upper fixing fitting into a lower plate connecting hole formed in the lower plate of the lower fixing fitting via the gap formed between the frame members of the two adjacent solar cell modules, an upper plate hole limned in the upper plate of the lower fixing fitting and a top face hole formed in the top face of the attachment base.

7. A solar cell module attachment structure for attaching, face-to-face, edges of two solar cell modules that are disposed adjacent in a right-left direction and spaced from each other onto a top face of an attachment base disposed along the edges in a front-rear direction, wherein each edge of the solar cell modules is provided with a frame member including: a holding portion that is formed of an upstanding holding wall, and an upper holding piece and a lower holding piece respectively extending from an upper end and a lower end of the holding wall in the same lateral direction, and that has a quadrangular cross section having one side open so that an edge of a solar cell panel is sandwiched inside the quadrangular shape having one side open; an upright wall portion provided continuously below the holding portion; and a bottom portion extending from a lower end of the wall portion in the same direction as the upper holding piece and the lower holding piece, wherein a wall portion of the frame member of each solar cell module is provided with a hook piece protruding outward from the wall portion, with a distal end thereof being bent upward and forming a protruding wall, with the use of an upper fixing fitting including: a pressing plate that is disposed so as to extend in the right-left direction across a gap formed between the protruding walls of the hook pieces, and that presses from above upper end faces of the protruding walls of the hook, and protrusion pieces that are formed at both front and rear edges of the pressing plate so as to protrude downward and that are inserted into the gap from above, and a lower fixing fitting including an upper plate and a lower plate that vertically sandwich the top face of the attachment base, the upper plate being sandwiched between the top face of the attachment base and the bottom portions of the frame members of the two adjacent solar cell modules, the upper plat including holding pieces formed by bending both right and left edges thereof upward, an inner face of the left-side holding piece being abutted by a distal end face of the bottom portion of the frame member of the left-side solar cell module of the adjacent solar cell modules, and an inner face of the right-side holding piece being abutted by a distal end face of the bottom portion of the frame member of the right-side solar cell module of the adjacent solar cell modules, the lower fixing fitting comprising a monolithic plate including the upper plate, the lower plate, a joint portion for joining the upper plate and the lower plate, and a lower plate rear wall bent vertically at a rear edge of the lower plate formed between the lower plate and the joint portion, wherein the joint portion includes, in a middle thereof, a bendable waist portion and the joint portion includes a wider portion than the bendable waist portion, wherein the lower fixing fitting bends at the joint portion to sandwich the top face between the upper plate and the lower plate, the two adjacent solar cell modules are attached to the attachment base by inserting a connecting member inserted from above into a pressing plate hole formed in the pressing plate of the upper fixing fitting into a lower plate connecting hole formed in the lower plate of the lower fixing fitting via the gap formed between the frame members of thetwo adjacent solar cell modules, and upper plate hole formed in the upper plate of the lower fixing fitting and a top face hole formed in the top face of the attachment base.

8. A solar cell module attachment structure used in the absence of one of two solar cell modules disposed adjacent and spaced from each other in a state in which edges of the two adjacently disposed solar cell modules can be attached, face-to-face, onto a top face of an attachment base disposed along the edges, wherein each edge of the solar cell module is provided with a frame member including: a holding portion that is formed of an upstanding holding wall, and an upper holding piece and a lower holding piece respectively extending from an upper end and a lower end of the holding wall in the same lateral direction, and that has a quadrangular cross section having one side open so that an edge of a solar cell panel is sandwiched inside the quadrangular shape having one side open; an upright wall portion provided continuously below the holding portion; and a bottom portion extending from a lower end of the wall portion in the same direction as the upper holding piece and the lower holding piece, with the use of an upper fixing fitting including: a pressing plate that presses from above the upper holding piece of the frame member provided at the edge of the solar cell module; protrusion pieces that are formed so as to be bent downward at front and rear edges of the pressing plate; an upstanding wall extending downward at one of both edges of the pressing plate in which the solar cell module is not present; and a bottom portion extending laterally from a lower end of the upstanding wall in a direction opposite to the direction in which the pressing plate is present, the upper fixing fitting being configured such that either of two side faces of the protrusion pieces pressing the frame member of the solar cell module in the lateral direction, and a lower fixing fitting including: an upper plate and a lower plate that vertically sandwich the top face of the attachment base, the upper plate being sandwiched between the top face of the attachment base and the bottom portion of the frame member of the solar cell module and between the top face of the attachment base and the bottom portion of the upper fixing fitting, the upper plate including holding pieces formed by bending both edges thereof upward., an inner face of the holding piece on the solar cell module side being abutted by a part of the bottom portion of the frame member of the solar cell module, and an inner face of the other holding piece being abutted by a part of the bottom portion of the upper fixing fitting, the solar cell module is attached to the attachment base by inserting a connecting member inserted from above into a pressing plate hole formed in the pressing plate of the upper fixing fitting into a lower plate connecting hole formed in the lower plate of the lower fixing fitting via a gap formed between the frame member of the solar cell module and the upstanding wall of the upper fixing fitting, an upper plate hole formed in the upper plate of the lower fixing fitting and a top face hole formed in the top face of the attachment base.

9. A solar cell module attachment structure for attaching, face-to-face, edges of two adjacently disposed solar cell modules onto a top face of an attachment base disposed along the edges, wherein each edge of the solar cell modules is provided with a frame member including: a holding portion holding a solar cell panel; a wall portion provided continuously with the holding portion; and a bottom portion that is provided continuously with the wall portion on a side opposite to the holding portion and that is attached onto the top face, and the solar cell module attachment structure is provided with a lower fixing fitting for fixing the bottom portion of the frame member on the top face of the attachment base and positioning the edges of the two solar cell modules relative to each other, wherein a rear edge of the upper plate and a rear edge of the lower plate of the lower fixing fitting are joined by the joint portion, and a connecting portion connecting the upper plate and the joint portion is vertically bent, an attachment aid hole allowing insertion of the joint portion and the lower plate of the lower fixing fitting is formed in the top face of the attachment base, and the top face of the attachment base is vertically sandwiched between the upper plate and the lower plate by inserting the joint portion and the lower plate of the lower fixing fitting into the attachment aid hole in the top face of the attachment base, with a lower plate frontal edge inserted first, and thereafter bending the waist portion of the joint portion of the lower fixing fitting so as to bring the lower plate into close contact with the upper plate, wherein in the lower fixing fitting, a lower plate rear wall bent vertically at a rear edge of the lower plate is formed between the lower plate and a joint portion, the upper plate and the lower plate of the lower fixing fitting are joined via the joint portion having, in a middle thereof, a bendable waist portion, and the joint portion includes a wider portion that the bendable waist portion.

10. The solar cell module attachment structure according to claim 9, wherein the attachment aid hole in the top face of the attachment base has a size that allows insertion of the joint portion and the lower plate of the lower fixing fitting, with a right-left direction of the lower plate of the lower fixing fitting aligned parallel to a lengthwise direction of the top face of the attachment base, and a width in the right-left direction of the attachment aid hole is wider than the width of the joint portion of the lower fixing fitting, and the joint portion and the lower plate of the lower fixing fitting are inserted with the right-left direction of the lower plate of the lower fixing fitting aligned parallel to the lengthwise direction of the top face of the attachment base, after the insertion, the entire lower fixing fitting is rotated at a right angle about the joint portion as an axis of rotation, and the waist portion of the joint portion of the lower fixing fitting is bent so as to bring the lower plate into close contact with the upper plate.

11. A solar cell module attachment structure for attaching, face-to-face, edges of two adjacently disposed solar cell modules onto a to face of an attachment base disposed along the edges, wherein each edge of the solar cell modules is provided with a frame member including: a holding portion holding a solar cell panel; a wall portion provided continuously with the holding portion; and a bottom portion that is provided continuously with the wall portion on a side opposite to the holding portion and that is attached onto the top face, and the solar cell module attachment structure is provided with a lower fixing fitting for fixing the bottom portion of the frame member on the top face of the attachment base and positioning the edges of the two solar cell modules relative to each other, wherein a rear edge of the upper plate and a rear edge of the lower plate of the lower fixing fitting are joined by the joint portion, and a connecting portion connecting the upper plate and the joint portion is vertically bent, an attachment aid hole allowing insertion of the joint portion and the lower plate of the lower fixing fitting is formed in the to face of the attachment base, and the top face of the attachment base is vertically sandwiched between the upper plate and the lower plate by inserting the joint portion and the lower plate of the lower fixing fitting into the attachment aid hole in the top face of the attachment base, with a lower plate frontal edge inserted first, and thereafter bending the waist portion of the joint portion of the lower fixing fitting so as to bring the lower plate into close contact with the upper plate, wherein in the lower fixing fitting, a lower plate rear wall bent vertically at a rear edge of the lower plate is formed between the lower plate and a joint portion, the upper plate and the lower plate of the lower fixing fitting are joined via the joint portion having, in a middle thereof, a bendable waist portion, and the joint portion includes a wider portion that the bendable waist portion, wherein a positioning slit for the lower fixing fitting is formed in front of the top face hole in the top face of the attachment base, and a downwardly bent positioning piece is formed at a frontal edge of the upper plate of the lower fixing fitting, and positioning in a lengthwise direction of the top face of the attachment base of the lower fixing fitting is performed by inserting from above the positioning piece into the positioning slit in the top face of the attachment base so that a distal end of the positioning piece of the upper plate of lower fixing fitting inserted into the positioning slit in the top face of the attachment base protrudes downward from the positioning slit, a frontal edge piece having a fitting slit allowing fitting of the distal end, protruding downward from the positioning slit, of the positioning piece of the upper plate of the lower fixing fitting is formed at the lower plate frontal edge of the lower fixing fitting , and the waist portion of the joint portion of the lower fixing fitting is bent so as to bring the lower plate into close contact with the upper plate by fitting the distal end, protruding downward from the positioning slit, of the positioning piece of the upper plate of the lower fixing fitting into the fitting slit of the lower plate frontal edge piece of the lower fixing fitting.

12. A solar cell apparatus in which edges of adjacent solar cell modules are attached pairwise onto an attachment base including a top face disposed along the edges, the solar cell apparatus comprising:
- a frame member provided at each edge of the solar cell modules;
- an upper fixing fitting provided between the frame members of the two adjacent solar cell modules;
- a lower fixing fitting including an upper plate that is held on the top face of the attachment base, the lower fixing fitting comprising a monolithic plate including the upper plate, a lower plate, a joint portion for joining the upper plate and the lower plate, and a lower plate rear wall bent vertically at a rear edge of the lower plate between the lower plate and the joint portion,
- wherein the joint portion includes, in a middle thereof, a bendable waist portion and the joint portion includes a wider portion that the bendable waist portion,
- wherein the lower fixing fitting bends at the joint portion to sandwich the top face between the upper plate and the lower plate, and
- a connecting member provided between the frame members of the two adjacent solar cell modules for connecting the upper fixing fitting and the lower fixing fitting,
- wherein the upper plate includes holding pieces formed by bending both edges thereof, an inner face of one of the holding pieces is abutted by a part of the frame member of one of the adjacent solar cell modules, and an inner face of the other holding piece is abutted by a part of the frame member of the other of the adjacent solar cell modules.

13. A solar cell apparatus in which edges of adjacent solar cell modules are attached pairwise onto an attachment base including a top face disposed along the edges, the solar cell apparatus comprising:
- a frame member provided at each edge of the solar cell modules and including a holding portion holding an edge of a solar cell panel, an upright wall portion provided continuously below the holding portion, and a bottom portion provided at a lower end of the wall portion;
- an upper fixing fitting provided between the frame members of the two adjacent solar cell modules;
- a lower fixing fitting including an upper plate and a lower plate that vertically sandwich the top face of the attachment base, the lower fixing fitting comprising a monolithic plate including the upper plate, the lower plate, a joint portion for joining the upper plate and the lower plate, and a lower plate rear wall bent vertically at a rear edge of the lower plate formed between the lower plate and the joint portion,
- wherein the joint portion includes, in a middle thereof, a bendable waist portion and the joint portion includes a wider portion than the bendable waist portion,
- wherein the lower fixing fitting bends at the joint portion to sandwich the top face between the upper plate and the lower plate,; and
- a connecting member that connects the upper fixing fitting and the lower fixing fitting via a gap formed between the frame members of the two adjacent solar cell modules,
- wherein the upper plate includes holding pieces formed by bending both edges thereof, an inner face of one of the holding pieces is abutted by a part of the frame member of one of the adjacent solar cell modules, and an inner face of the other holding piece is abutted by a part of the frame member of the other of the adjacent solar cell modules.

14. A solar cell module attachment structure comprising:
- a frame member holding an edge of a solar cell panel;
- an attachment base including a top face for placing the frame member;
- a lower fixing fitting for fixing the frame member on the top face, the lower fixing fitting comprising a monolithic plate including an upper plate, a lower plate, a joint portion for joining the upper plate and the lower plate, and a lower plate rear wall bent vertically at a rear edge of the lower plate formed between the lower plate and the joint portion,
- wherein the joint portion includes, in a middle thereof, a bendable waist portion and the joint portion includes a wider portion than the bendable waist portion, the lower fixing fitting bending at the joint portion and sandwiching the top face between the upper plate and the lower plate; and
- a connecting member to connect the upper plate and the lower plate for sandwiching the top face.

* * * * *